United States Patent
Wang et al.

(10) Patent No.: US 9,739,616 B2
(45) Date of Patent: Aug. 22, 2017

(54) TARGET RECOGNITION AND LOCALIZATION METHODS USING A LASER SENSOR FOR WHEELED MOBILE ROBOTS

(75) Inventors: Junmin Wang, Dublin, OH (US); Madhu Soodhanan Govindarajan, Columbus, OH (US); James W. Post, II, Dublin, OH (US); Andrew John Fox, Powell, OH (US)

(73) Assignee: Honda Motor Co., Ltd., Tokyo (JP)

( * ) Notice: Subject to any disclaimer, the term of this patent is extended or adjusted under 35 U.S.C. 154(b) by 360 days.

(21) Appl. No.: 14/123,062

(22) PCT Filed: Jun. 1, 2012

(86) PCT No.: PCT/US2012/040499
§ 371 (c)(1),
(2), (4) Date: Aug. 29, 2014

(87) PCT Pub. No.: WO2012/167110
PCT Pub. Date: Dec. 6, 2012

(65) Prior Publication Data
US 2014/0372028 A1    Dec. 18, 2014

Related U.S. Application Data

(60) Provisional application No. 61/492,669, filed on Jun. 2, 2011, provisional application No. 61/552,823, filed on Oct. 28, 2011.

(51) Int. Cl.
*G01C 21/00* (2006.01)
*G01C 21/20* (2006.01)
(Continued)

(52) U.S. Cl.
CPC ............. *G01C 21/20* (2013.01); *G01B 7/004* (2013.01); *G01B 11/028* (2013.01);
(Continued)

(58) Field of Classification Search
None
See application file for complete search history.

(56) References Cited

U.S. PATENT DOCUMENTS

| 4,566,032 A | 1/1986 | Hirooka et al. |
| 4,796,198 A | 1/1989 | Boultinghouse |

(Continued)

OTHER PUBLICATIONS

Bengtsson, et al. "Robot localization based on scan-matching—estimating the covariance matrix for the IDC algorithm." In: Robotics and Autonomous Systems, vol. 44, 2003, pp. 29-40 (online) http://www.sciencedirect.com/science/article/pii/S0921889003000083.

(Continued)

*Primary Examiner* — Rami Khatib
*Assistant Examiner* — Gerrad A Foster
(74) *Attorney, Agent, or Firm* — Rankin, Hill & Clark LLP

(57) ABSTRACT

A localization scheme and method using a laser sensor for indoor wheeled mobile robots (IWMR), which need to localize themselves for working autonomously, is provided. In this method, a laser sensor moves inside an onboard guide way and its distance measurements are used to robustly detect and recognize a unique target based on edge detection and pattern recognition techniques. From the distance measurements with respect to the recognized target, a kinematic model is developed to determine the IWMR orientation and location in the global co-ordinates (in 2-D). Such target recognition and localization methods are validated with experimental results.

9 Claims, 21 Drawing Sheets

(51) Int. Cl.
*G01B 7/004* (2006.01)
*G06T 11/00* (2006.01)
*G01B 11/02* (2006.01)
*G05D 1/02* (2006.01)

(52) U.S. Cl.
CPC ........... *G01C 21/206* (2013.01); *G05D 1/024* (2013.01); *G06T 11/005* (2013.01)

(56) References Cited

U.S. PATENT DOCUMENTS

| | | | |
|---|---|---|---|
| 6,697,761 B2 | 2/2004 | Akatsuka et al. | |
| 7,845,560 B2 | 12/2010 | Emanuel et al. | |
| 2006/0196945 A1 | 9/2006 | Mendels | |
| 2008/0154504 A1 | 6/2008 | Hein et al. | |
| 2009/0055024 A1 | 2/2009 | Kay | |
| 2010/0092079 A1 | 4/2010 | Aller | |
| 2010/0169043 A1* | 7/2010 | Watts | G01B 17/02 702/171 |
| 2011/0280490 A1* | 11/2011 | Sarkar | G06K 9/00442 382/209 |

OTHER PUBLICATIONS

Boulanger, et al. "Integration of synthetic surface relief in range images." In: Computer Vision, Graphics, and Image Processing, vol. 47, Issue 3, Sep. 1989, pp. 361-372 (online) http://www.sciencedirect.com/science/article/pii/0734189X89901187.

Jensfelt, Patric. "Localization Using Laser-Scanning and Minimalistic Environmental Models." Licentiate Thesis, Automatic Control Department of Signals, Sensors, and Systems; Royal Institute of Technology, Stockholm, Sweden. 1999 (online).

Nickerson, et al. "The Ark Project: Autonomous mobile robots for known industrial environments." In: Robotics and Autonomous Systems, vol. 25, Issues 1-2, Oct. 31, 1998, pp. 83-84 (online) http://www.sciencedirect.com/science/article/pii/S0921889098000323.

Van Gestel, et al. "A performance evaluation test for laser line scanners on CMMs." In: Optics and Lasers in Engineering, vol. 47, Issues 3-4, Mar.-Apr. 2009, pp. 336-342 (online) http://www.sciencedirect.com/science/article/pii/S0143816608001292.

* cited by examiner

1) Buffer time > front area scanning time.
2) Collect and store '$m$' and '$\theta$' for buffer time. (Fig. 11)
3) Edge detection criteria
   - $\Delta m_i = m_i - m_{i-1}$, where '$i$' denotes sampling index.
   - $|\Delta m_i|>$ smallest depth of the target.
4) Detect at least two such edges (Fig. 12).
5) If $\Delta m_i > 0$
       Select $t_{i-1}$
   Else
       Select $t_i$
   This will make sure points on front surface of the target are selected.
6) Using Eq. (5) given below transform the data collected into IWMR co-ordinates plot $X_V$ and $Y_V$).
7) Select points $P_{neg} = [X_V(t_i)\ Y_V(t_i)]$ or $P_{pos} = [X_V(t_{i-1})\ Y_V(t_{i-1})]$ corresponding to times instants chosen in step 5.
8) Join $P_{neg}$'s or $P_{pos}$'s by a straight line (Fig. 13).
9) IWMR orientation '$\Phi$' = slope of line in step 8 (Fig. 13).
10) Using Eq. (6) transform these into laser sensor co-ordinates ($X_l$ and $Y_l$).
11) Move the template on top of this data set.
12) Determine $H_{(A,B)}$ from Eq. (3), where $A = X_l$ and $Y_l$ data, and $B$ = Moved template data.
13) If Hausdorff distance < small cutoff value Select template match.

FIG. 10

TARGET RECOGNITION AND LOCALIZATION METHODS USING A LASER SENSOR FOR WHEELED MOBILE ROBOTS

BACKGROUND

Localization of indoor wheeled mobile robots (IWMR) has been an active area of research since the 1980s. Self-localization is defined as the capability to determine its own posture (orientation and location). Dead-reckoning navigation techniques, which rely on internal sensors such as the odometer or encoders, have been the earliest of techniques used in this field. In dead-reckoning systems, the posture error grows without bound, which limited its use as a secondary technique with other localization methods. Different types of external sensors or combinations of external sensors have also been used for localization. The sensors employed include video cameras, infrared sensors, laser sensors, ultrasonic sensors, radio frequency identification sensors (RFID), sonar sensors and global positioning system (GPS), etc. Different sensor-based localization methods have their own application limitations. Camera-based localization depends heavily on the lighting condition of the ambient environment, thus rendering it ineffective under insufficient lighting conditions. RFID sensor needs to know the ambient environment, henceforth reducing its effectiveness in situations where knowledge about the environment is unavailable.

Ultrasonic sensors are more sensitive to environmental noises. For example, in a noisy environment the diffusion of ultrasonic waves could be high which reduces the accuracy. Thus ultrasonic sensors cannot be used as a stand-alone sensor for localization in a noisy environment and can only be used along with other sensors. GPS-based localization has relatively low accuracy, slow update rate, and availability issues. Laser sensor based localization supersedes these sensors in that it doesn't depend on lighting nor is it sensitive to environmental noise. Also, unlike GPS based localization, laser-based IWMR localization does not need a local base station, which makes GPS-based localization an expensive technique for indoor applications.

Laser sensor based IWMR localization generally needs a priori knowledge of the entire environment or at least the landmark features in the environment. Thus existing laser sensor based localization algorithms can be divided into two categories—algorithms that search for patterns in the entire environment and algorithms that seek landmark features on the floor such as lines, line segments, and so on.

Localization results have also been used to update local portions of a global map. The process of updating a global map using the localization results is termed as Simultaneous Localization and Mapping (SLAM). Different algorithms have been proposed to perform SLAM. There have been efforts to reduce the complexity of these algorithms. If the dependence on sensor fusion techniques to obtain accurate localization results is reduced, complexity of the SLAM algorithms can also be lowered. In the past, SLAM problems have been conducted in static and dynamic environments.

BRIEF DESCRIPTION

In accordance with one aspect, a mobile robot target system comprises a target having a surface with depth variations; and a mobile robot having a laser sensor mounted thereon for scanning the target to localize the robot.

In accordance with another aspect, a mobile robot target system comprises a target having a surface with depth variations; and a laser sensor adapted to scan the target for localization.

In accordance with yet another aspect, a method for localizing a wheeled robot/vehicle using a laser sensor comprises collecting and storing laser sensor measurements to a target and rotary actuator angular positions of the laser sensor; detecting edges on a target based on laser sensor measurements and rotary actuator angular positions; transforming collected measurements and angular positions into vehicular coordinates; identifying vehicular coordinates corresponding to the detected edges of the target; and determining global coordinates for the identified vehicular coordinates.

The exemplary method further comprises the determined global coordinates being compared with templates of the target to confirm that the target has been recognized; Hausdorff distances between the determined global coordinates and the templates being minimized; generating templates for the target; and determining the global coordinates includes joining the identified vehicular coordinates in a straight line; and determining the slope of the straight line to determine an orientation of the robot/vehicle.

The exemplary method further comprises determining the orientation of the wheeled robot/vehicle in the determined global coordinates; reducing the influence of noise in the laser sensor measurements on the determined global coordinates; and approximating the noise of the laser sensor measurements by a white Gaussian noise.

BRIEF DESCRIPTION OF THE DRAWINGS

FIG. 10 is a pseudo code for the target recognition algorithm.

DETAILED DESCRIPTION

The subject disclosure proposes a new technique for localizing IWMRs (in an unknown static 2-D environment that is, no knowledge about the environment or landmark features in the environment is needed) based on laser sensor distance measurements alone (with respect to a target). The proposed technique is different from the existing ones in that it does not need a priori knowledge about the environment and thus gives the flexibility of employing this technique in uncertain environments. The only requirement for this technique is the capability to place the target at a known global location in an uncertain environment (no knowledge about the environment is required). Further, the complexity of SLAM algorithms can be reduced by developing a localization technique that uses a laser sensor alone, with the assumption that the unknown environment is static (i.e., there is no moving object in the entire environment).

Figure 1:
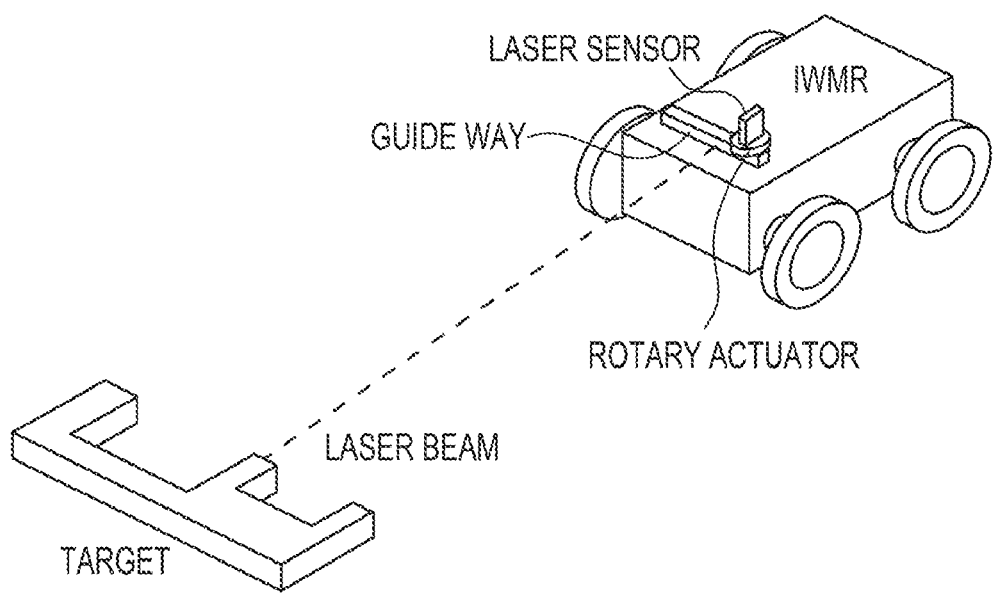
FIG. 1 is an illustration of laser sensor based IWMR localization.

The system hardware configuration for the proposed localization scheme according to one embodiment is shown in FIG. 1. FIG. 1 depicts an exemplary IWMR having a laser sensor operably connected thereto. The laser sensor can be mounted on a rotary actuator that can span a wide angular section (e.g., 180 degrees) for reliably detecting the target and self-localizing in a wide range. To further increase the operating range of the exemplary system, a linear actuator, fixed on the IWMR body, can be used as a guide way to move the rotary actuator and laser sensor together along the IWMR lateral direction.

Figure 2:
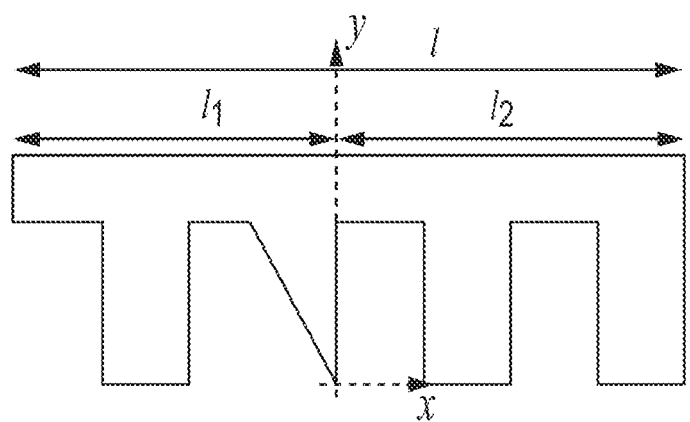
FIG. 2 is a cross-section of an example target.

According to one aspect, the target used in this localization method has a surface with uniquely combined depth variations. As a result, the target can be identified properly by the distance measurements when the laser sensor beam scans through the target surface. The cross-section of an example target that can be used is given in FIG. 2. The center of this target (small dot) marks the origin location from which the global co-ordinates are measured.

Figure 3:
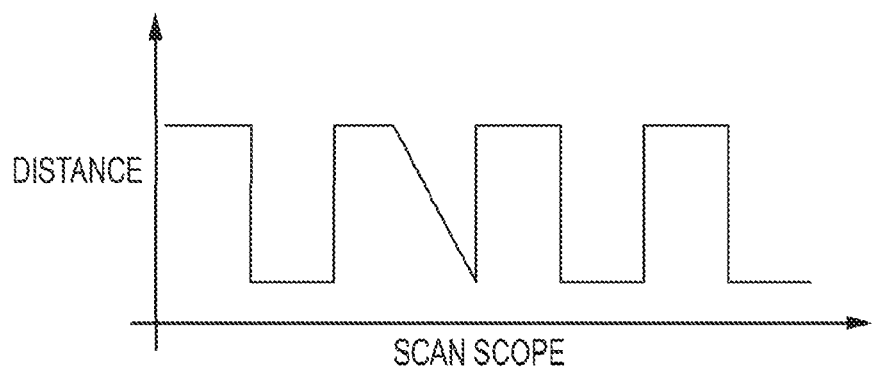
FIG. 3 is an Illustration of measured distance when the laser sensor scans through the target surface.

FIG. 3 illustrates the edge detected in the laser sensor measurement as the target surface is scanned by the laser beam once when the IWMR is located in the third quadrant. This distance measurement pattern matches exactly with the physical target depth pattern shown in FIG. 2. By examining the measured distance sequence pattern, the target can thus be recognized. Note that more complex target shapes can be used to elevate the target uniqueness and make it more distinguishable from its surroundings and backgrounds. The detected target, whose global location and orientation (always parallel to the global x axis) are known, together with the laser sensor distance measurements with respect to the target can be employed to self-localize the IWMR in the global coordinates.

Target Design

As will be appreciated by those skilled in the art, the target design, which includes the target shape, material, and color, will affect the laser sensor distance measurement accuracy, visible range and consequently influence the target recognition capability and localization accuracy of the system. Several target design guidelines generated from experimental results are described below.

Generalized Target Design Methodology and Guidelines

Figure 4:
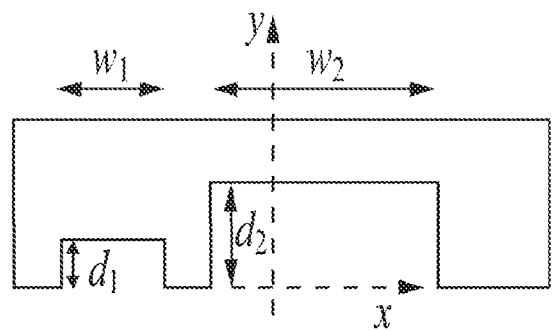
FIG. 4 is a cross-section of a target and the design parameters.

FIG. 4 shows the cross section of an exemplary target and corresponding design parameters, namely the depth and width pairs $(d_i, w_i)$. The x-y axis on the target marks the global co-ordinates along which the IWMR is localized. The target may be unique in shape and to detect the edges robustly there may be at least two genuine edge depth variations as shown in FIG. 4. (in this case i=2). The design effort is focused in choosing the ratio between edge depth-to-width. This can be chosen based on the worst angle of the laser sensor, which is defined as the angle where 1) The laser sensor loses its required accuracy, due to refraction of signal;
2) The entire length of the target cannot be seen by the laser sensor; and
3) Neither of the two edges of a slot can be detected by the laser sensor measurements.

Figure 5:
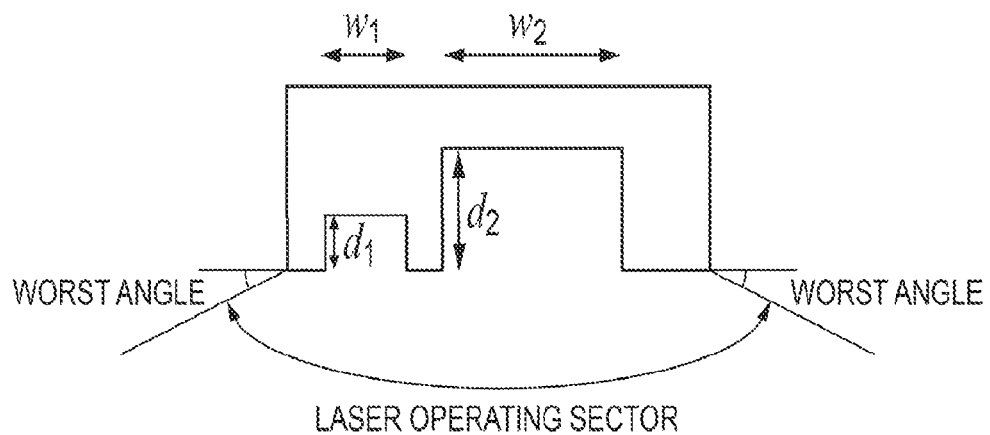
FIG. 5 is an illustration of worst angle of a laser sensor.

Thus, worst angle of a laser sensor is the sector in which a laser sensor cannot operate accurately. This is depicted in FIG. 5.

An exemplary design is one that takes into consideration the worst scenario. The design (edge depth-to-width ratio) should address the event when the laser sensor is placed at the worst angle. It should be such that even if the laser sensor is viewing the target from the worst angle, all $d_i$'s in the $d_i$ and $w_i$ pairs are seen. Thus the angle formed by all of these $d_i$ and $w_i$ pairs should always be greater than the worst angle. This will reduce the chance of detecting two edges which is necessary for the target recognition technique. Thus, the edge-to-depth ratio should be greater than or equal to the tangent of the worst angle.

$$\tan^{-1}\left(\frac{d_i}{w_i}\right) \geq \text{worst\_angle}, \quad \text{for all } i. \qquad (1)$$

(or)

$$\frac{d_i}{w_i} \geq \tan(\text{worst\_angle}), \quad \text{for all } i. \qquad (2)$$

Figure 6:
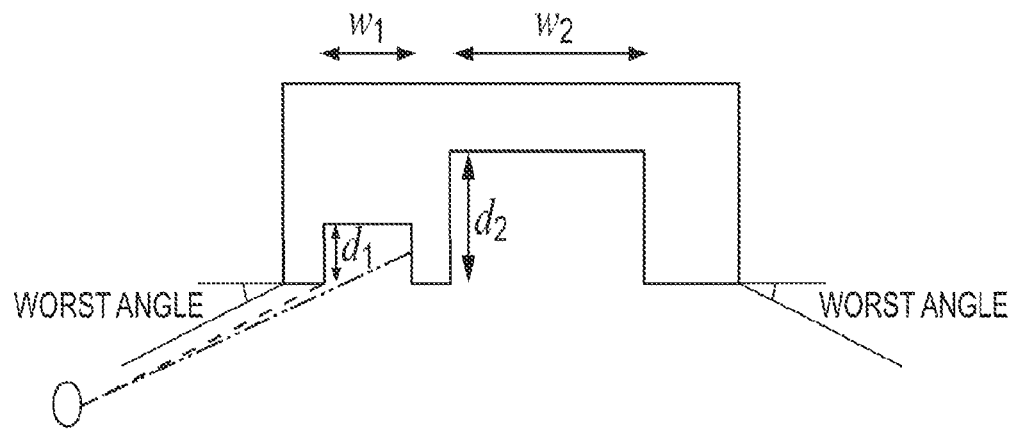
FIG. 6 is an Illustration of a target design.

If the condition given in Eq. (1) is not met by any $d_i$ and $w_i$ pair, then the chance of detecting two edges is reduced. Thus, the edge-to-depth ratio should be greater than or equal to the tangent of the worst angle. An example scenario is illustrated in FIG. 6. If the designed target does not meet the condition given in Eq. (1), in the $d_1$ and $w_1$ pair alone, then the edge $d_1$ will not be seen in the laser sensor measurement. In FIG. 6, the solid dot represents the laser sensor (located on the worst angle); the dashed line and dashed-dot line denote two successive scanning instances of the laser sensor. As shown, the surface on width $w_1$ (blocked in FIG. 6) cannot be seen by the laser sensor. Hence the depth $d_1$ will not be seen in the laser sensor measurements. Thus a failure to meet condition given in Eq. (1) can lead to a target that has a chance of not being recognized by the target recognition algorithm.

Laser Sensor Specific Target Design

Figure 7:
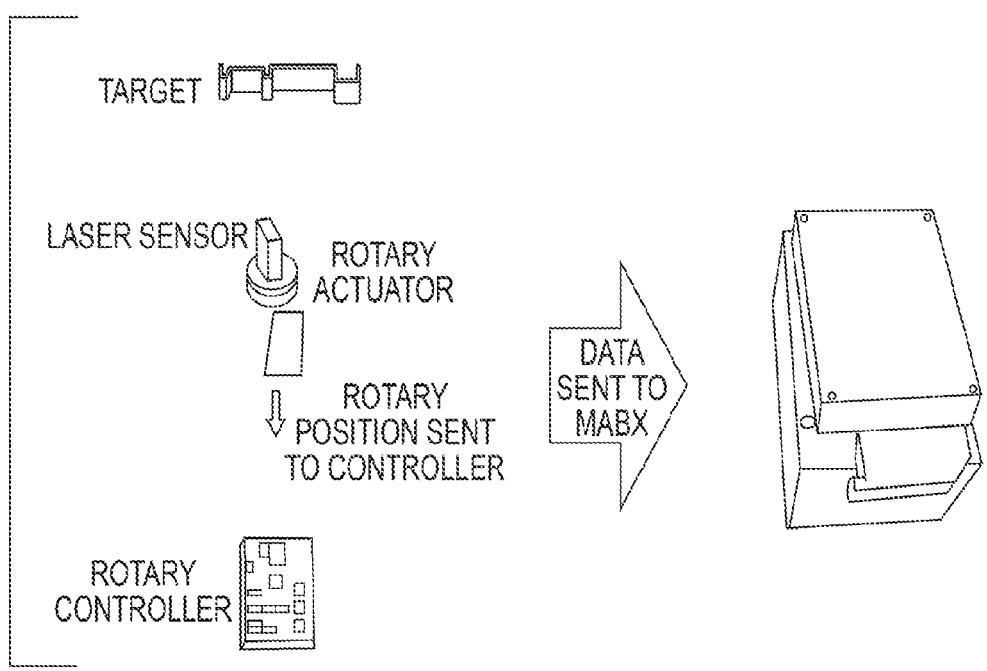
FIG. 7 is an experimental setup for determining the worst angle of a laser sensor.

It is evident from the definition of worst angle that it depends on the specific laser sensor being used. The value of worst angle has to be determined for the specific laser sensor. Experiments were conducted for an example laser sensor used in one embodiment of this disclosure (ODSL 96B M/V6-2000-S12 manufactured by Leuze Electronics), to determine the worst angle. The laser sensor measurements can be collected in a dSPACE Micro Auto Box (MABX) as shown in FIG. 7. Here, the laser sensor is placed at different angles closer to the target at a known location for evaluating the accuracy of measurement. The worst angle for this specific laser sensor was determined to be 14°. Once a particular worst angle value is known or determined, targets (specific for one exemplary laser sensor) can be designed.

Figure 8:
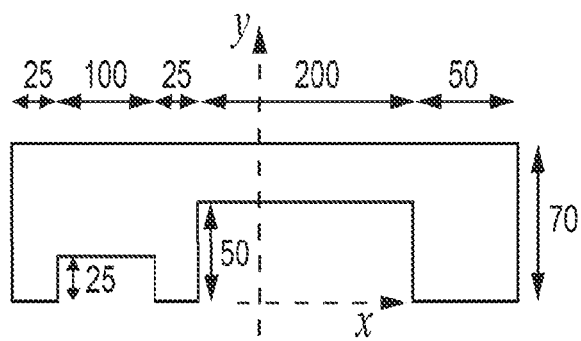
FIG. 8 is a cross-section of a laser sensor specific target shape (asymmetrical).
Figure 9:
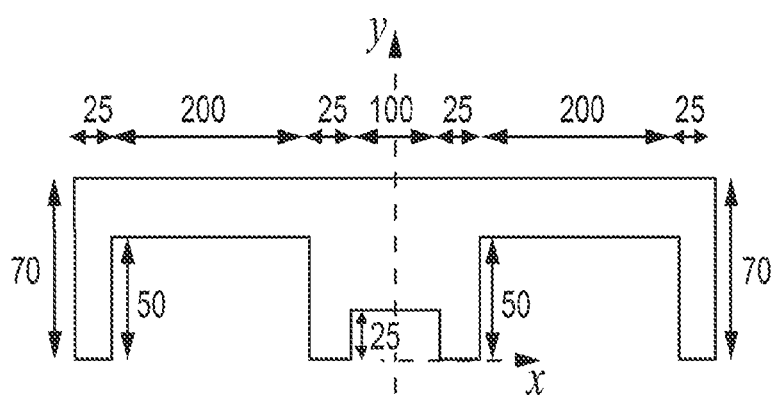
FIG. 9 is a cross-section of a laser sensor specific target shape (symmetrical).

The edge depth-to-width ratio according to the formula given in Eq. (2) should be greater than 1/4.0108. Taking this into consideration, a target can be designed with an edge depth-to-width ratio of ¼. An exemplary designed target is shown in FIG. 8. The target shown in FIG. 8 is asymmetric about its origin; hence another target that is symmetric about the origin is also designed. FIG. 9 gives an idea about the design parameters of the symmetrical target.

Overall Length of the Target

The overall length of the target can be chosen based on scanning time being proportional to the overall length of the target. Thus, the target should not be too long. However, the target should be long enough to accommodate at least two edges that obey the condition shown in Eq. (2). The length portions other than $w_i$'s do not carry any significance, they are merely present to separate the two edges.

Material Choice for the Target

Another aspect of target design is material selection. Different materials and colors can be tested for reflectivity property to a laser source. In one embodiment, the materials chosen were polished aluminum, unpolished stainless steel, and the colors chosen were white, red and orange. Polished aluminum and unpolished stainless steel were chosen for their high reflectivity and ease of merchantability. The colors chosen are the most popular ones used in roadside warnings due to their high reflectivity. In order to select the appropriate material for the target, experiments were conducted to see the influence of reflectivity on the accuracy of laser sensor measurements. Table 1 shows the laser sensor measurements when the sensor was placed at a distance of 930 mm perpendicular to target coated with all of these materials.

TABLE 1

Laser sensor measurement errors
(when laser sensor is perpendicular to the target)

| Material/color used | Laser sensor measurements (in mm) | Error (in %) |
|---|---|---|
| White color | 932.2393 | 0.24 |
| Red color | 937.7802 | 0.84 |
| Orange color | 936.9589 | 0.75 |
| Aluminum (polished) | 931.2392 | 0.13 |
| Stainless steel (Unpolished) | 933.9255 | 0.42 |

TABLE 2

Laser sensor measurement errors
(when laser sensor is at the worst angle)

| Material/color used | Laser sensor measurements (in mm) | Error (in %) |
|---|---|---|
| White color | 933.3101 | 0.36 |
| Red color | 936.874 | 0.74 |
| Orange color | 936.276 | 0.67 |
| Aluminum (polished) | 0 | 100 |
| Stainless steel (Unpolished) | 943.2503 | 1.42 |

Table 2 above shows the laser sensor measurements when the sensor was placed at a distance of 930 mm and scanning the farthest point on the target at the worst angle (14°). In Table 2 it is evident that the polished aluminum reflector behaves like a mirror and hence will not be a good choice for the target material. Using the above experimental data, white color coating can be chosen for the target.

Target Recognition Method

This section will explain the target recognition method used according to one embodiment. Pattern recognition in wheeled mobile robots is used in vision-based localization techniques. The pattern recognition techniques include different measures like Image Euclidean distance and Hausdorff distance. Hausdorff distance is a measure that is widely used in pattern recognition, because of its robustness to noise. In this measure is used to compare pattern set 'A' with the image set 'B' obtained from the camera feed on the wheeled mobile robot. An exact match is shown when the Hausdorff distance between the two sets is zero. The definition for Hausdorff distance is described in Eq. (3). Given two point sets A and B, the Hausdorff distance between A and B is defined as $$H(A, B) = \max(h(A, B), h(B, A)) \qquad (3)$$

where $$h(A, B) = \sup_{a \in A} \inf_{b \in B} \|a - b\| \qquad (4)$$

and ||.|| represents Euclidean norm. The function h (A, B) is called the directed Hausdorff distance from A to B.

Target Recognition Algorithm

As mentioned above, a linear actuator and rotary actuator can provide the laser sensor with linear and rotary motion capabilities. Of these, the rotary actuation is adapted to scan the frontal area of an IWMR and the linear actuation is adapted to increase the robustness (e.g., in case of an obstacle in front of the target). Here, the assumption is that 1) the linear actuator position is on the left end of the guide way or 2) at least the position at which the linear actuator is located when the laser sensor measurements are taken is known. An exemplary pseudo code for the target recognition method/algorithm is shown in FIG. 10.

Figure 11:
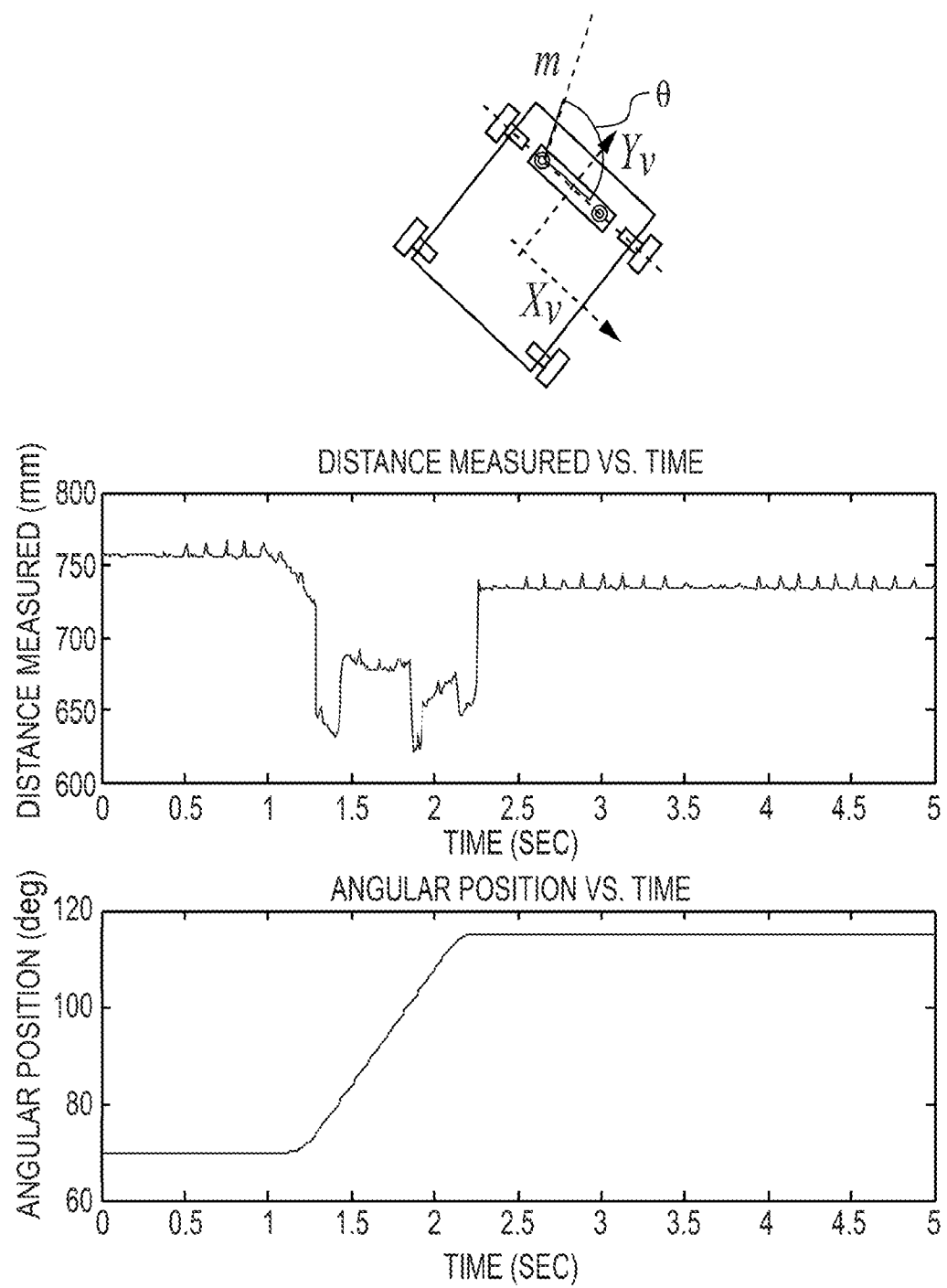
FIG. 11 graphically depicts experimental data collection during a target scan.
Figure 12:
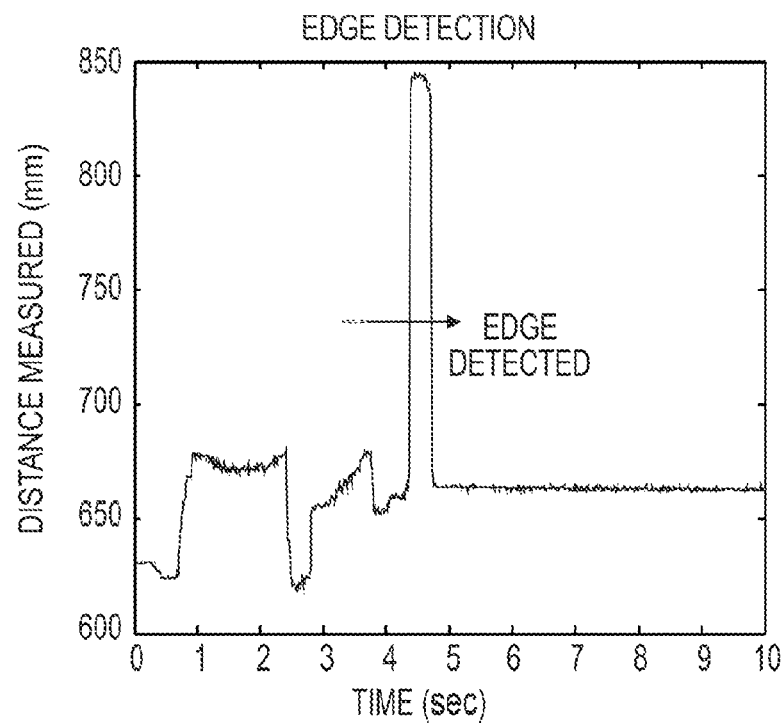
FIG. 12 graphically depicts edge detection from experimental data.

In FIG. 11, $X_v$-$Y_v$ shows the IWMR body-fixed co-ordinates. The data collected are 1) laser sensor measurements 'm' and 2) rotary actuators position 'θ' with respect to the positive $X_v$ axis (which is associated with the laser sensor guide way). The pseudo code explains clearly that the algorithm looks for two edges that have a minimum length equal to the minimum depth of the target (e.g., 25 mm). FIG. 12 shows the scenario in which $|\Delta m_i|>$ smallest depth of the target condition is met and the edge detected is shown.

$$\begin{bmatrix} X_v \\ Y_v \end{bmatrix} = \begin{bmatrix} m \cos \theta \\ m \sin \theta \end{bmatrix} \quad (5)$$

Target Recognition Algorithm

Eq. (5) can be used to transform the entire set of data collected into IWMR co-ordinates (seen from the laser sensor). When two such edges are detected in the measurements, corresponding time instant points in the IWMR body-fixed co-ordinate information ($X_v$ and $Y_v$) can be joined by a straight line. The algorithm makes sure that the corresponding time instant points are from the front surface of the target.

Figure 13:
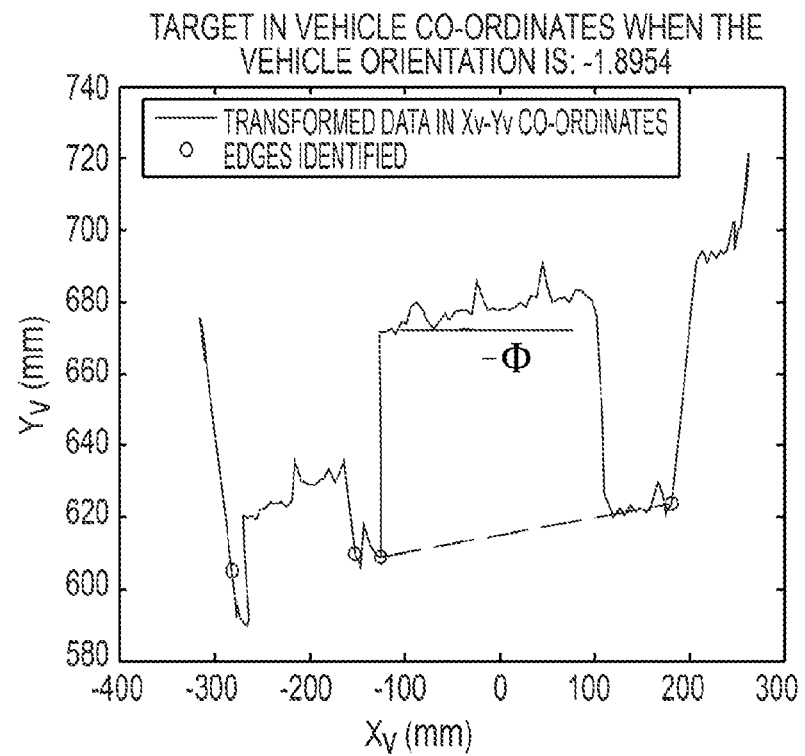
FIG. 13 graphically depicts IWMR orientation determination.

The IWMR orientation determination section of the pseudo code is explained with reference to FIG. 13. The fact that the target is placed with its surface along the global x axis can be used in orientation determination. The slope of this line with respect to $X_v$ axis is equal to the negative of the orientation Φ of IWMR in the global co-ordinates.

$$\begin{bmatrix} X_l \\ Y_l \end{bmatrix} = \begin{bmatrix} \cos\Phi & -\sin\Phi \\ \sin\Phi & \cos\Phi \end{bmatrix} \begin{bmatrix} X_v \\ Y_v \end{bmatrix} \quad (6)$$

Eq. (6) can be used to transform the edge points into the laser sensor co-ordinates $X_l$-$Y_l$ (seen from the laser sensor). This $X_l$-$Y_l$ co-ordinate set is the additive inverse of the global co-ordinates x-y. This has been introduced so that the templates of the target can be translated to these co-ordinates and compared; to see if the target is recognized (will be explained in detail below).

Target Template Generation

Figure 14:
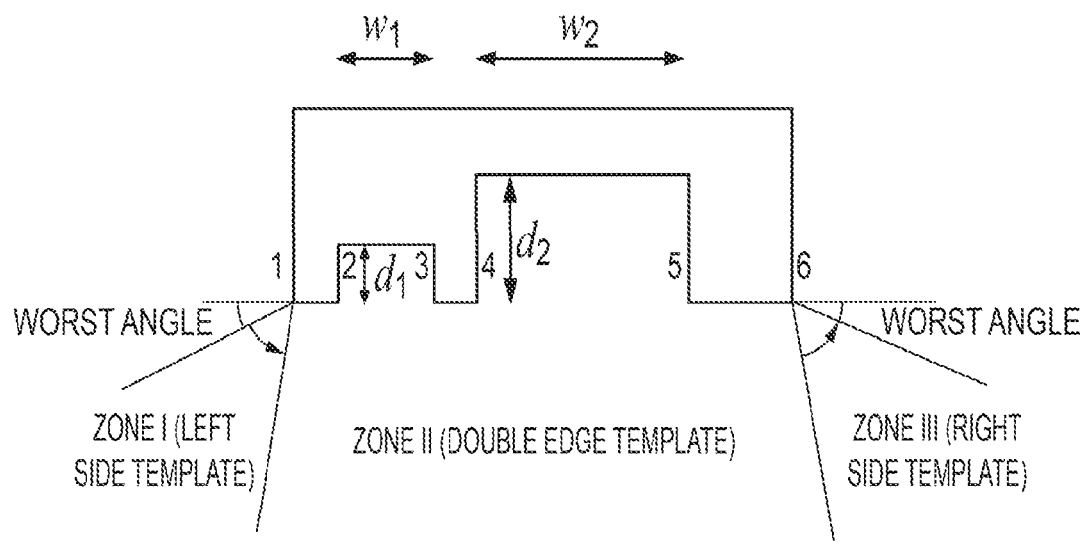
FIG. 14 is an illustration of three different zones in front of a target.

Three different templates need to be created for every target based on the location of the IWMR. The three zones in front of the target where the IWMR could be located for which three different templates are needed are shown in FIG. 14. In FIG. 14, the edges are marked with numbers from 1 through 6 for easier reference. If the IWMR is located in Zone I, edges 1, 3 and 5 will be seen by the laser sensor. If the IWMR is located in Zone II, all 6 edges will be seen in the laser sensor measurements. Similarly, if the IWMR is located in Zone III, the laser sensor measurement will contain the edges 2, 4 and 6.

Figure 15:
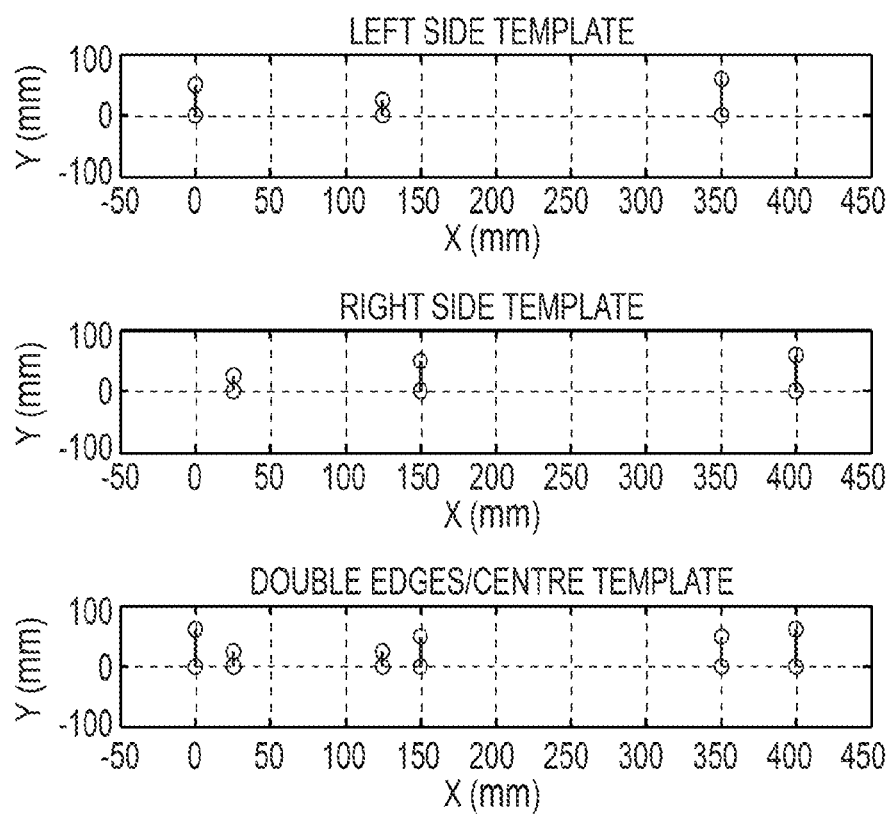
FIG. 15 graphically depicts three different templates for a specific target.

Hence while choosing the template; this information can be included as shown in FIG. 15. In order to have a generic template it is defined in global co-ordinates. The generic template can be translated to the laser co-ordinates, which is explained below. The Hausdorff distance between the templates and the transformed target information is supposed to be zero (when they are exactly matched). Here, since the laser sensor measurements are noisy, a small value instead of zero is used as the threshold of the Hausdorff distance. Such a threshold value can be experimentally determined.

Target Recognition Experimental Validation

This section shows the experimental results of target recognition for both the targets designed according to one embodiment. As explained above, the rotary actuator motion is a priority in target recognition. The rotary actuator rotates at a constant speed which can be chosen based on a few criteria:

At this sampling rate the laser sensor measurements are Gaussian with a standard deviation of about 3 mm.

The laser sensor used should have a small amount of latency (0.01 sec, value supplied by the manufacturer) for its measurements to be accurate. Thus, the measurement sampling rate should not be greater than 100 Hz.

When the rotary sensor is scanning the entire frontal area (180°), if the scanning speed is too high, the laser sensor accuracy will be affected due to the fact mentioned in the previous point.

Test runs at different speeds were done to choose the ideal speed of the rotary actuator. These results are tabulated in Table 3 below. In these test runs, the rotary actuator was oriented at 0° with respect to $X_v$ axis of the IWMR and at a distance of 675 mm to the target.

TABLE 3

Localization error for different rotary actuator speeds

| Rotary actuator scanning speed (rad/s) | Orientation error (in deg) (Orientation - 0°) | Location error (in mm) (Center - 675 mm) |
| --- | --- | --- |
| 3.1416 | 8.4982 | 20 |
| 1.5708 | 5.2154 | 2.9 |
| 0.7854 | 1.8826 | 2.0 |
| 0.3927 | 0.2651 | 1.8 |

Figure 16:
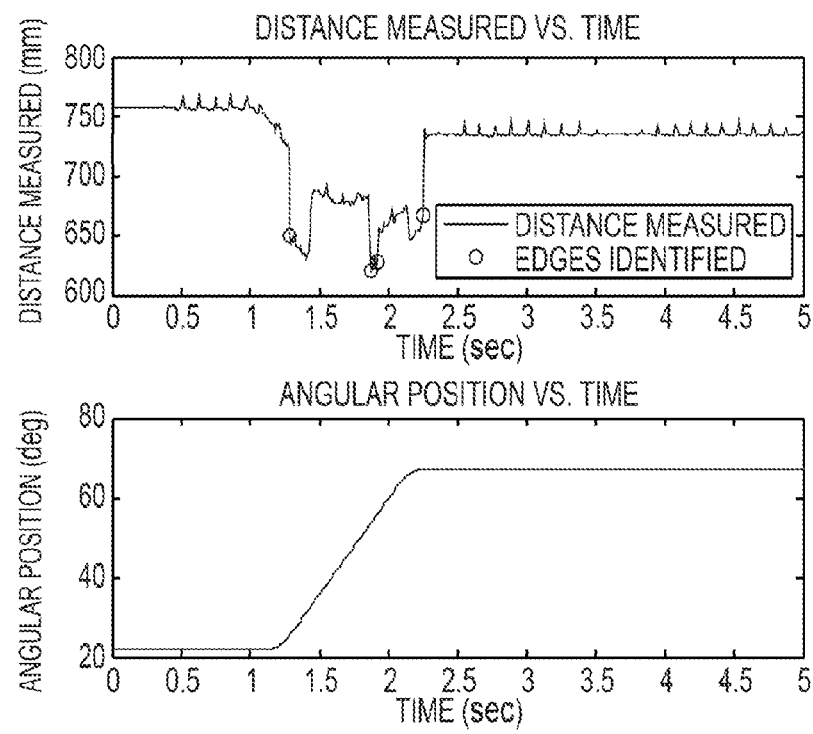
FIG. 16 graphically depicts laser sensor measurement and rotary actuator angular position versus time.

From Table 3 it is clear that the localization accuracy is affected significantly at high speeds, and when it gets lesser than 0.7854 rad/s, the accuracy does not change much. Thus the 0.7854 rad/s speed can be used to perform target recognition, because it takes less time (compared to 0.3927 rad/s) to scan the entire front area and has good accuracy. The asymmetric target designed (shown in FIG. 8) was tested for target recognition. Laser sensor measurements plotted against time (with more than two edges identified by the algorithm) is provided in FIG. 16. It also shows the rotary actuator's position.

Figure 17:
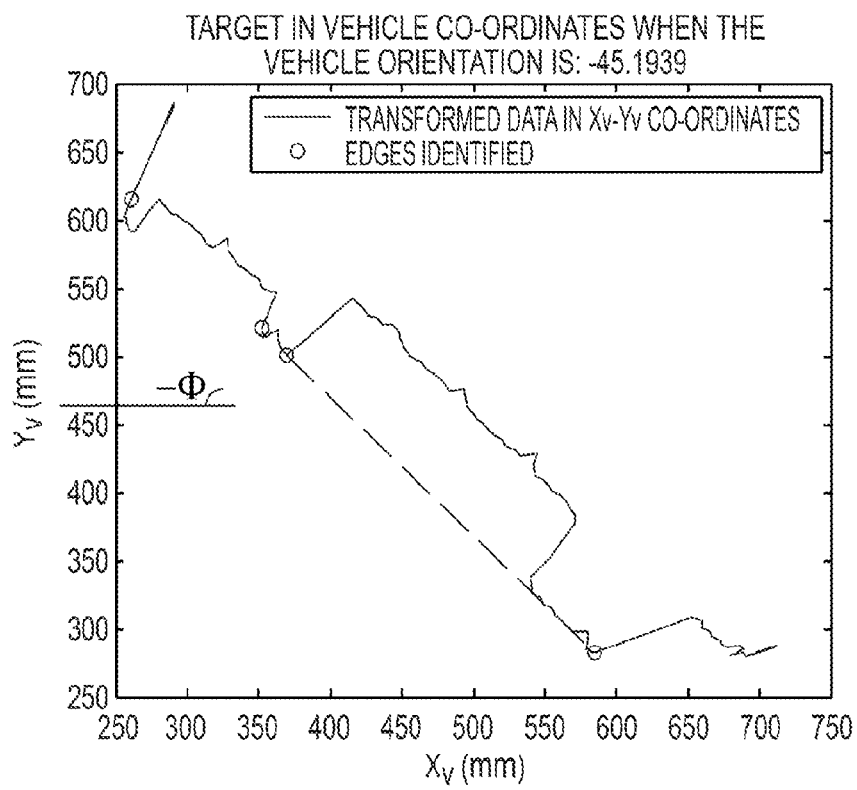
FIG. 17 graphically depicts IWMR orientation determined by the algorithm.
Figure 18:
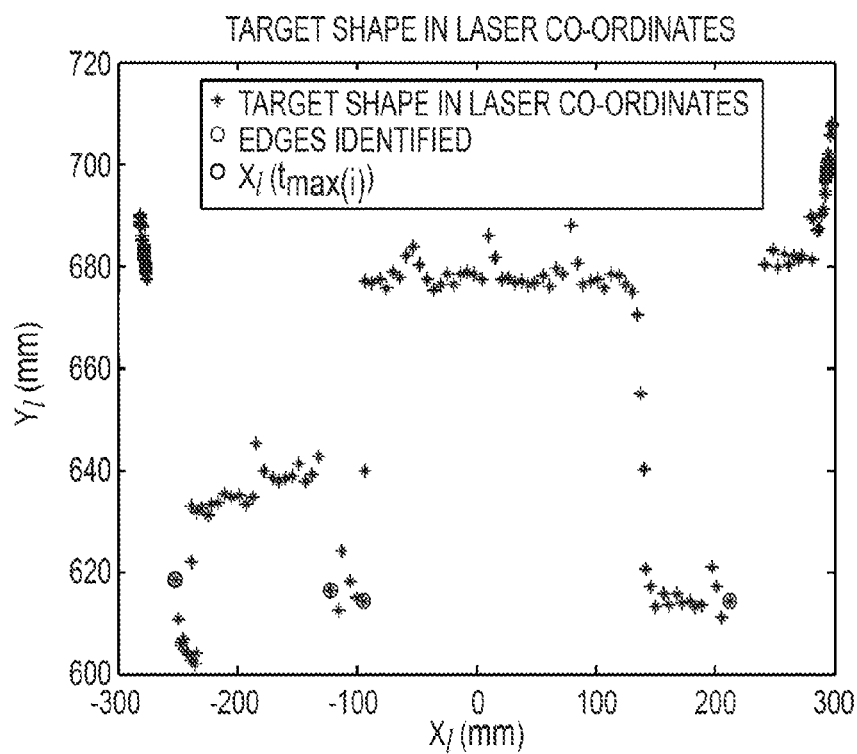
FIG. 18 graphically depicts target shape in laser sensor co-ordinates.

Determination of IWMR orientation in the global co-ordinates using the exemplar method explained above is shown in FIG. 17. In this experiment, the IWMR location is given as X=0 mm and Y=−615 mm with orientation=45 deg. This is equivalent to saying that the IWMR was in Zone II, which is explained in FIG. 14. FIG. 18 shows the target shape in laser sensor co-ordinates, which can be obtained by using Eq. (6).

To perform target recognition, the templates have to be translated from the global co-ordinates to the laser sensor co-ordinates. For this translation, the fact that "points on the front surface of the target are selected in the edge detection algorithm" can be used. The entire template can be translated such that the points on the template (those which correspond to the points on the front surface of the target) match the points from the edge detection algorithm. In other words, the templates have to be translated in the global x direction by $X_l(t_{max(i)})$ and in the global y direction by the average of $Y_l$ values of points identified in the edge detection part.

Figure 19:
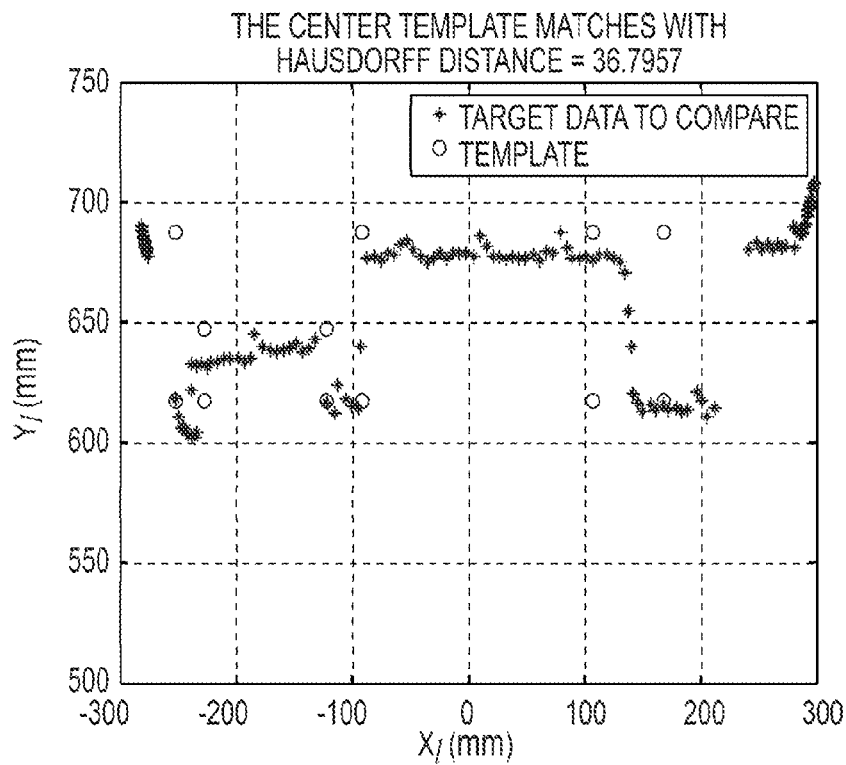
FIG. 19 graphically depicts center template match.

Here, $X_l(t_{max(i)})$=−252.2514 mm and average of the $Y_l$ values of the points identified in edge detection=617.2743 mm. FIG. 19 shows the moved template on top of the data points and it can be seen that the minimum Hausdorff distance is obtained when the center template matches. The vehicle orientation determined by the algorithm may not be 100% accurate due to the signal noises. This error in orientation results has also affected the minimum value, which can be seen clearly from FIG. 19.

The IWMR was located in Zone I, oriented at 90 degrees and at a distance of X=−300 mm and Y=−550 mm for the next set of experiments.

Figure 20:
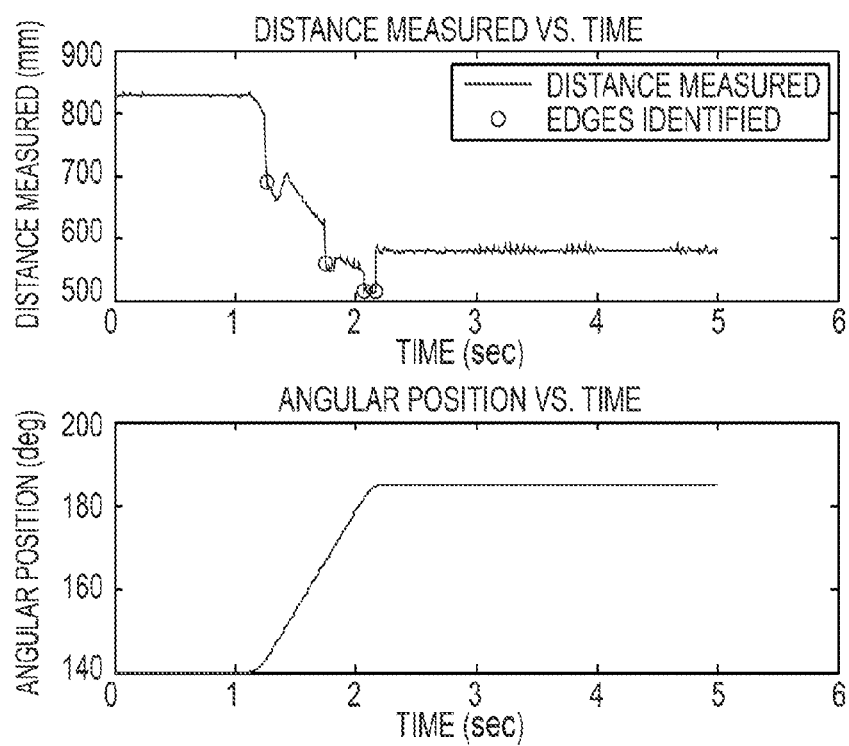
FIG. 20 graphically depicts laser sensor measurement and rotary actuator angle versus time.

FIG. 20 shows the laser sensor measurements plotted against time, with more than two edges being identified. It also shows the rotary actuator's angular position plotted versus time.

Figure 21:
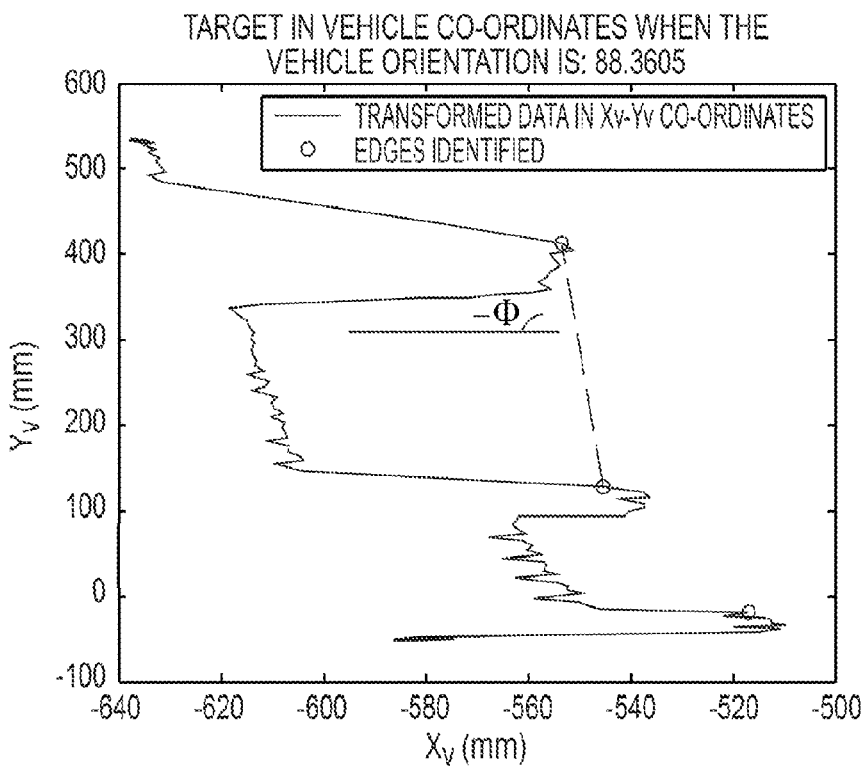
FIG. 21 graphically depicts vehicle orientation when IWMR is in Zone I.

FIG. 21 shows the vehicle orientation in the global co-ordinates determined by the exemplary method.

Figure 22:
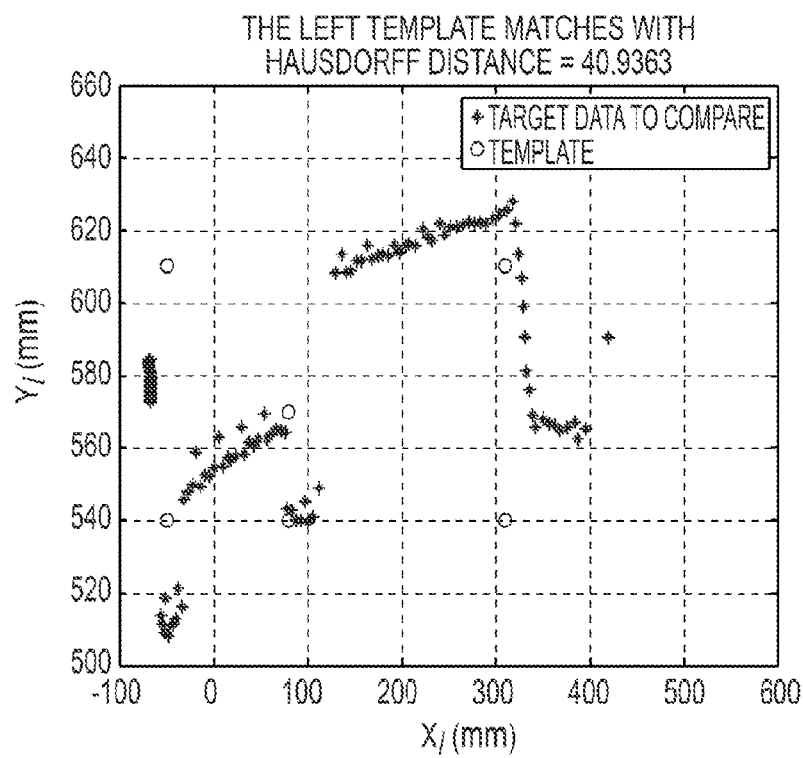
FIG. 22 graphically depicts left template match.
Figure 25:
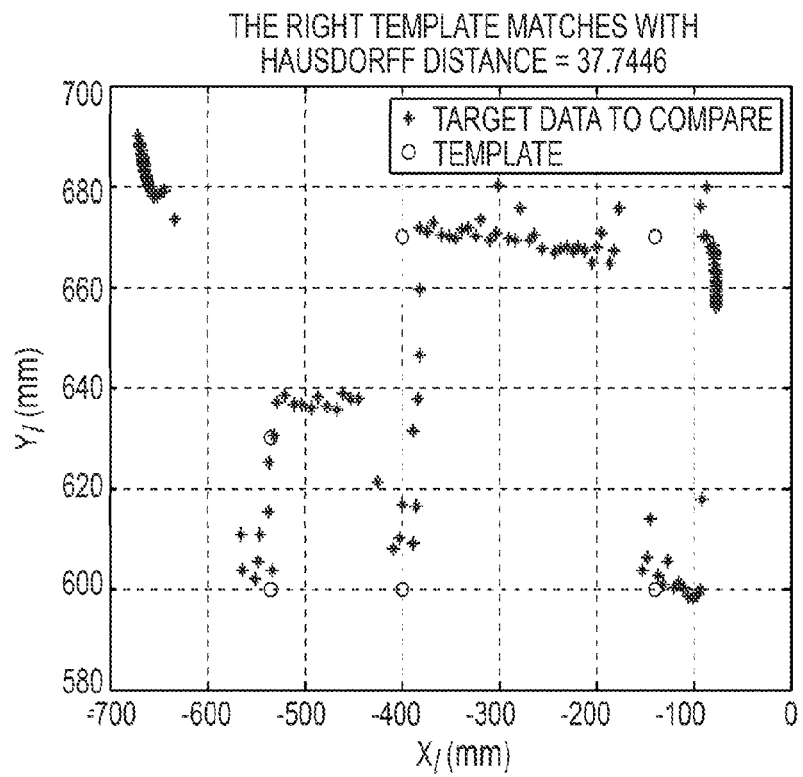
FIG. 25 graphically depicts right template match.

FIG. 22 and FIG. 25 show that this algorithm works even when the vehicle is located in Zone I and Zone III, where the algorithm selected the left and right templates, respectively.

Figure 23:
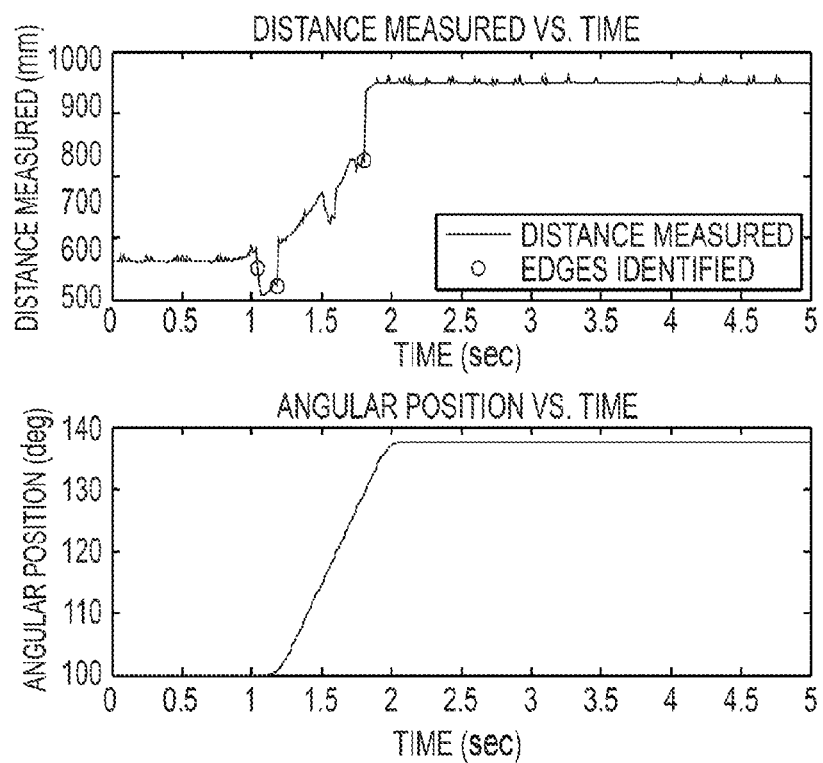
FIG. 23 graphically depicts laser sensor measurement and rotary angle versus time.
Figure 24:
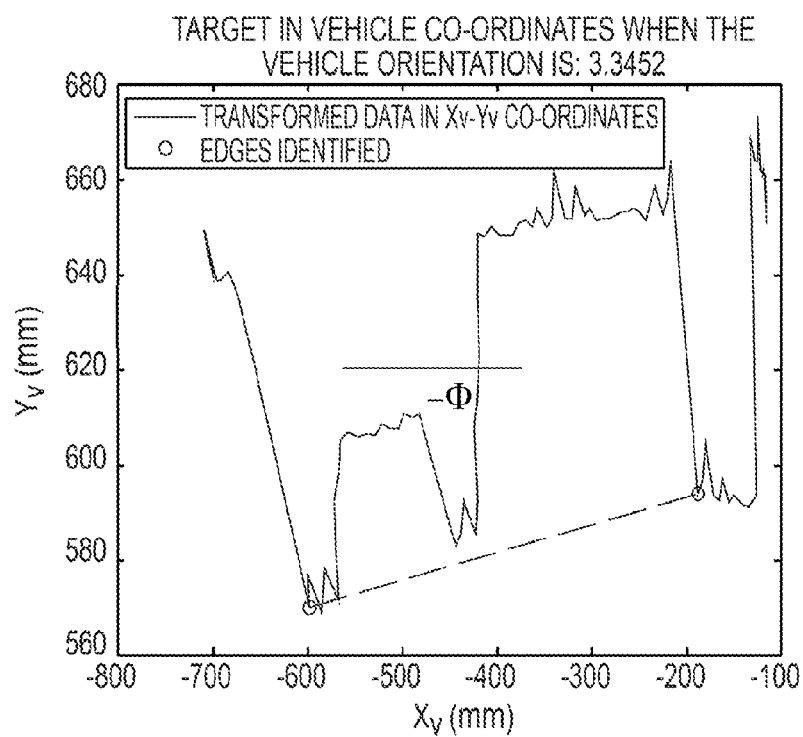
FIG. 24 graphically depicts vehicle orientation determined by the algorithm.

In Zone III, the vehicle was oriented at 0 degrees and at a location X=300 mm and Y=−600 mm. The laser sensor measurements and rotary actuator position is plotted against time in FIG. 23. IWMR orientation determined by the exemplary method is shown in FIG. 24.

The symmetric target designed (shown in FIG. 9) was tested for target recognition at the same experimental locations. The results are tabulated as a comparison chart against target recognition for the asymmetric target in Table 4.

TABLE 4

Target recognition.

| Location of IWMR (in mm) and orientation | | | | Target recognition, Hausdorff distance (in mm) | |
|---|---|---|---|---|---|
| (in deg) | | | | Asymmetric | Symmetric |
| X | Y | φ | Zone | target | target |
| 0 | −615 | 45 | 1 | 36.7957 | 31.4817 |
| −300 | −550 | 90 | 2 | 40.9363 | 32.7109 |
| 300 | −600 | 0 | 3 | 37.7446 | 15.1800 |

Figure 26:
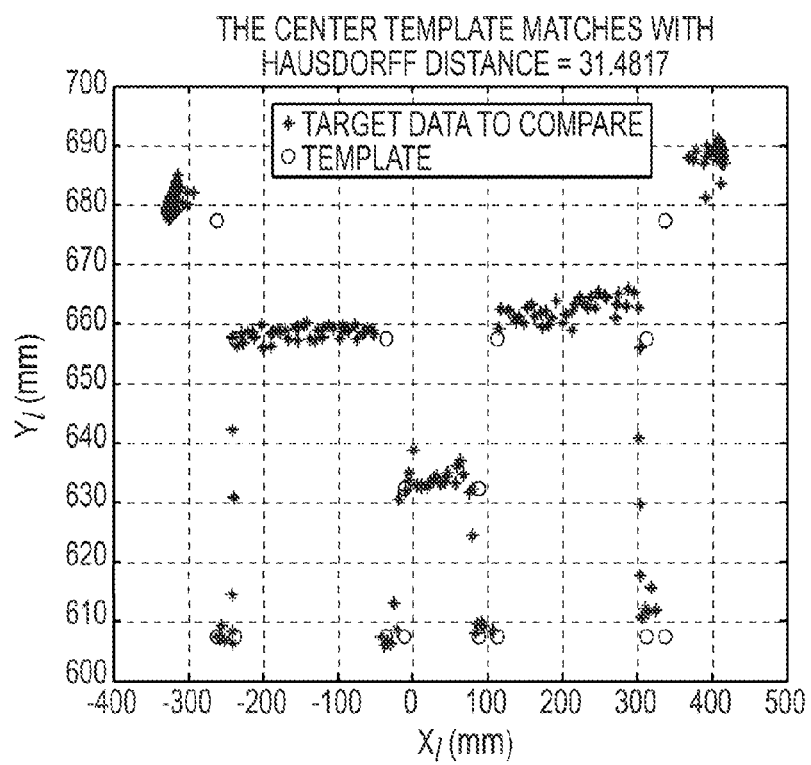
FIG. 26 graphically depicts center template match.
Figure 27:
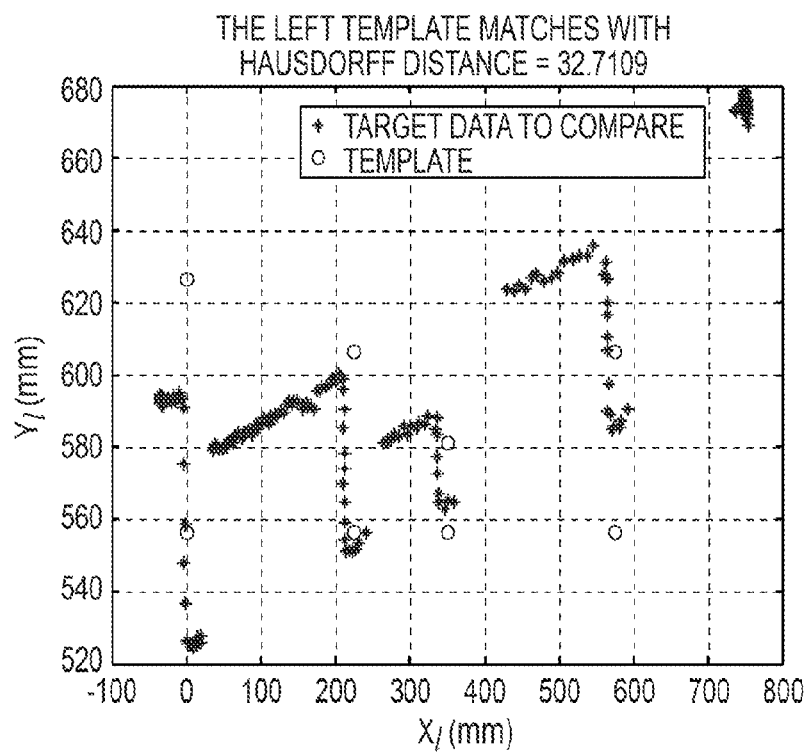
FIG. 27 graphically depicts left template match.
Figure 28:
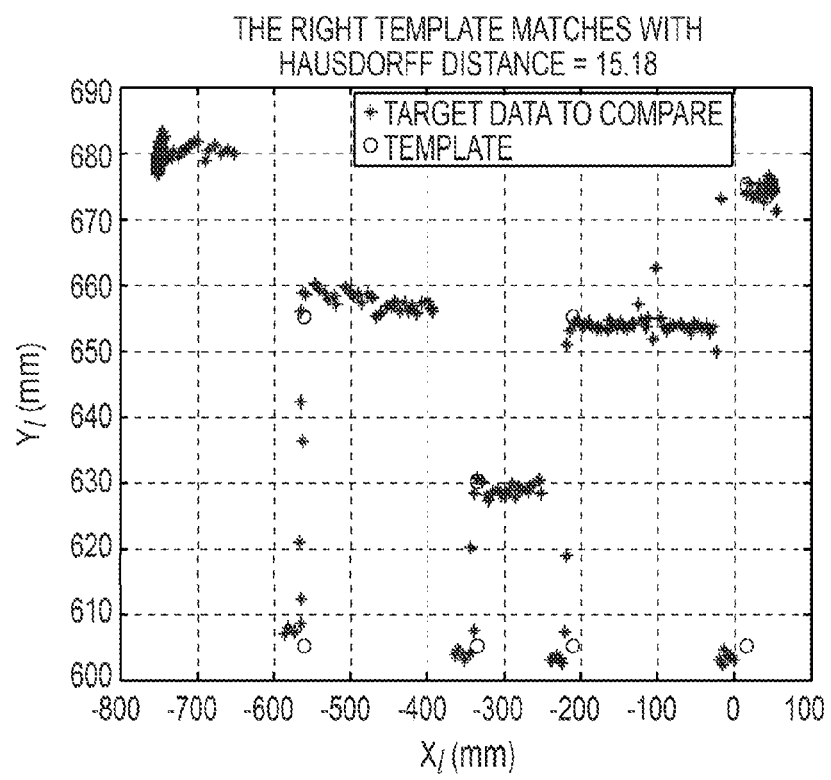
FIG. 28 graphically depicts right template match.

FIG. 26-FIG. 28 give a visual representation of the target recognition algorithm for the symmetric target when the IWMR is located in Zone II, Zone I and Zone III respectively. From Table 4 it can be seen that the Hausdorff distance value for the symmetric target is smaller compared to that of the asymmetric target. This may be attributed to the fact that the symmetric target has more number of edges than the asymmetric target.

IWMR Localization Method and Results

The experimental results of the target recognition algorithm show that the designed targets can be recognized. Although that in itself is a validation for the target design, this section presents the experimental results that show the localization results for the designed asymmetric target.

Figure 29:
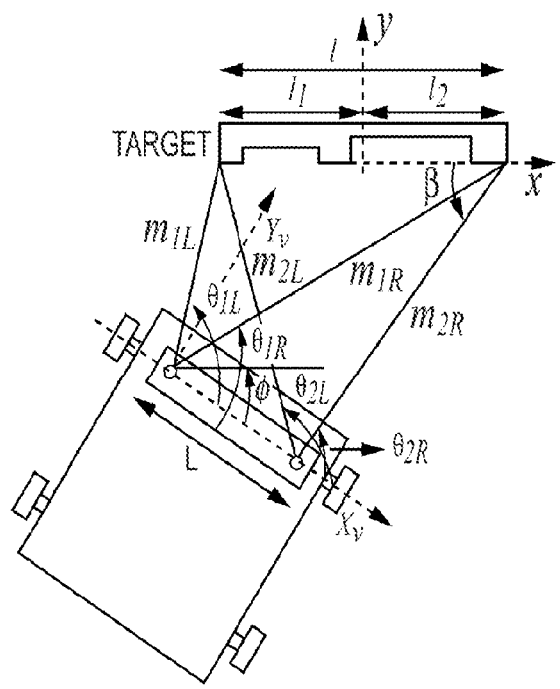
FIG. 29 is an Illustration of notations used in localization.

FIG. 29 shows a schematic design with the notations used in the exemplary IWMR localization method. The angles measured with respect to the positive x-axis of the IWMR body-fixed ($X_v$) from the left end of the laser sensor guide way to the left and right ends of the target are denoted by $\theta_{1L}$, $\theta_{1R}$ respectively. Similarly the angles measured with respect to the positive x-axis of the IWMR ($X_v$) from the right end of the laser sensor guide way to the left and right ends of the target are denoted by $\theta_{2L}$, $\theta_{2R}$ respectively. The laser sensor measurements from the left end of the laser sensor guide way to the left and right ends of the target are denoted by $m_{1L}$ and $m_{1R}$, respectively, and the set of measurements from the right end of the laser sensor guide way to the left and right ends of the target are denoted by $m_{2L}$ and $m_{2R}$, respectively.

Analytical Determination of Location and Orientation

Here, the fact that a quadrilateral is formed between the two distance measurements ($m_{1L}$ and $m_{2R}$), the laser sensor guide way length (L) and the target object length (l) can be used to find the orientation of the vehicle in the global co-ordinates.

The area of quadrilateral using the sides and diagonals given in Eq. (7) (which are known) can be equated to the area of quadrilateral using sides and the angles included given in Eq. (8) (one of them is unknown). The unknown angle β can be calculated from Eq. (9).

$$\text{area\_sides\_diagonals} = \frac{1}{4}\sqrt{4m_{1R}^2 m_{2L}^2 - (m_{1L}^2 + m_{2R}^2 - l^2 - L^2)^2} \quad (7)$$

$$\text{area\_sides\_angels} = \frac{1}{2}Lm_{1L}\sin(\theta_{1L}) + \frac{1}{2}lm_{2R}\sin(\beta) \quad (8)$$

$$\frac{1}{4}\sqrt{4m_{1R}^2 m_{2L}^2 - (m_{1L}^2 + m_{2R}^2 - l^2 - L^2)^2} = \quad (9)$$
$$\frac{1}{2}Lm_{1L}\sin(\theta_{1L}) + \frac{1}{2}lm_{2R}\sin(\beta)$$

The angle made by the line joining the right end of the laser sensor guide way to the right end of the target with the global positive x axis (x) can be found from the previous step to be equal to the unknown quantity β. The vehicle orientation with respect to the global positive x-axis (x) 'φ' (shown in FIG. 29), can then be calculated using the formula given in Eq. (10) and Eq. (11).

$$\phi = \theta_{2R} - \beta \quad (10)$$

$$\phi = \theta_{2R} - \sin^{-1}\left[\frac{1/2\sqrt{4m_{1R}^2 m_{2L}^2 - (m_{1L}^2 + m_{2R}^2 - l^2 - L^2)^2} - Lm_{1L}\sin\theta_{1L}}{lm_{2R}}\right] \quad (11)$$

The location of the vehicle (the left end of the scanner guide-way in this case) with respect to the left end of the target on the vehicle co-ordinate axes can be found out using simple kinematic analysis. Eq. (12) shows the formula for the same.

$$\begin{bmatrix} x_v \\ y_v \end{bmatrix} = \begin{bmatrix} -u_s(m_{1R} - m_{1L})\cos\theta_{1L} & u_s(m_{1L} - m_{1R})\cos\theta_{1R} \\ -u_s(m_{1R} - m_{1L})\sin\theta_{1L} & -u_s(m_{1L} - m_{1R})\sin\theta_{1R} \end{bmatrix} \begin{bmatrix} m_{1L} \\ m_{1R} \end{bmatrix} \quad (12)$$

Here, a unit step function $u_s(\square)$ is included, whose value is 1 when its argument is non-negative and zero otherwise. This unit step function is included so that based on the laser sensor measurements, the IWMR location in quadrant III or quadrant IV can be distinguished. Then the appropriate measurements can be used to determine the IWMR's position. The location on the vehicle co-ordinate axis can then be transformed to the global co-ordinate axis by using the transformation matrix shown in Eq. (13).

$$\begin{bmatrix} x \\ y \end{bmatrix} = \begin{bmatrix} \cos\phi & \sin\phi \\ -\sin\phi & \cos\phi \end{bmatrix} \begin{bmatrix} x_v \\ y_v \end{bmatrix} + \begin{bmatrix} -u_s(m_{1R} - m_{1L}) & u_s(m_{1L} - m_{1R}) \\ 0 & 0 \end{bmatrix} \begin{bmatrix} l_1 \\ l_2 \end{bmatrix} \quad (13)$$

Figure 30:
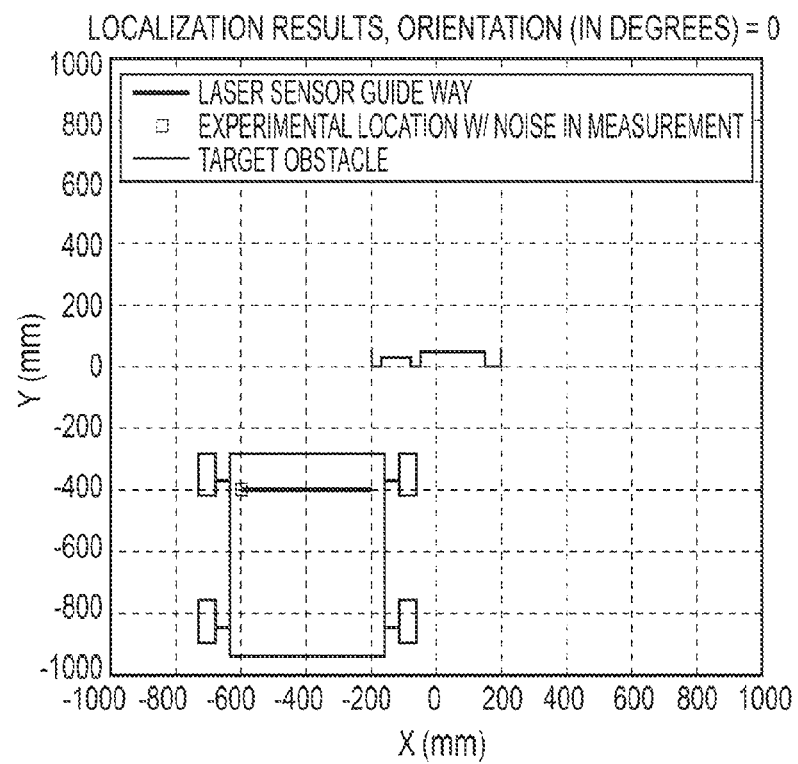
FIG. 30 graphically depicts localization experimental results (IWMR in Quadrant III).
Figure 31:
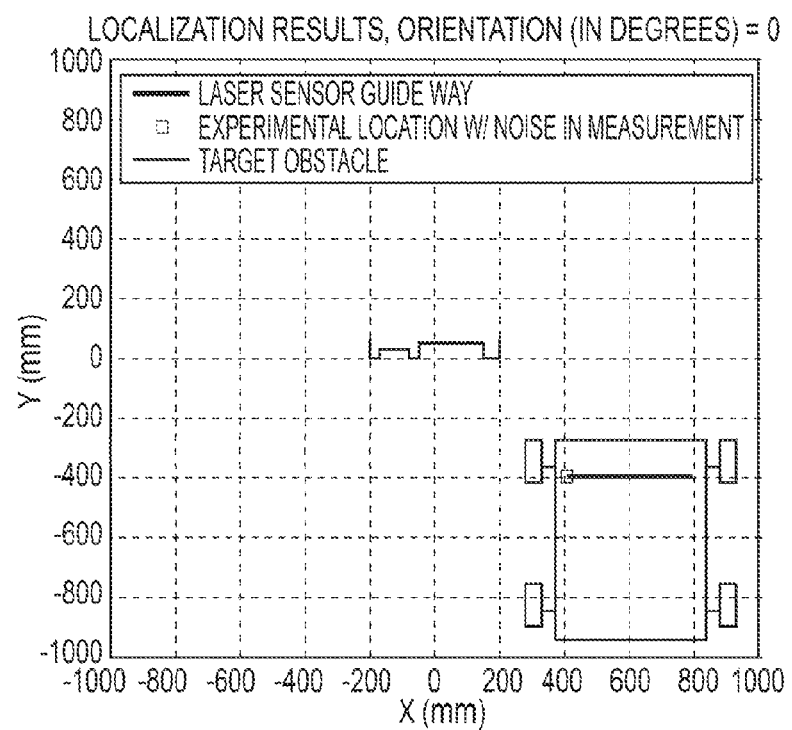
FIG. 31 graphically depicts localization experimental results (IWMR in Quadrant IV).

FIG. 30 and FIG. 31 show the experimental results obtained using this kinematic based localization technique, when the asymmetrical target is tested.

In FIG. 30, the left end of laser sensor guide way is physically placed at x=-600, y=-400 and with an IWMR orientation of 0 degrees. The black square in FIG. 30-FIG. 33 is the localization result using laser sensor measurements. In order to make the figures self-explanatory, an IWMR is drawn around the laser sensor guide way.

TABLE 5

Localization results.

| Actual location (in mm) and orientation (in deg) | | | Localization results (in mm) | | Localization results (in deg) |
|---|---|---|---|---|---|
| x | y | φ | x | y | φ |
| -600 | -400 | 0 | -598.72 | -400 | 0 |
| 400 | -400 | 0 | 399.28 | -398.78 | 0 |
| -200 | -400 | 90 | -200 | -398.54 | 90 |
| -200 | -800 | 45 | -199.54 | -798.73 | 45 |

Figure 32:
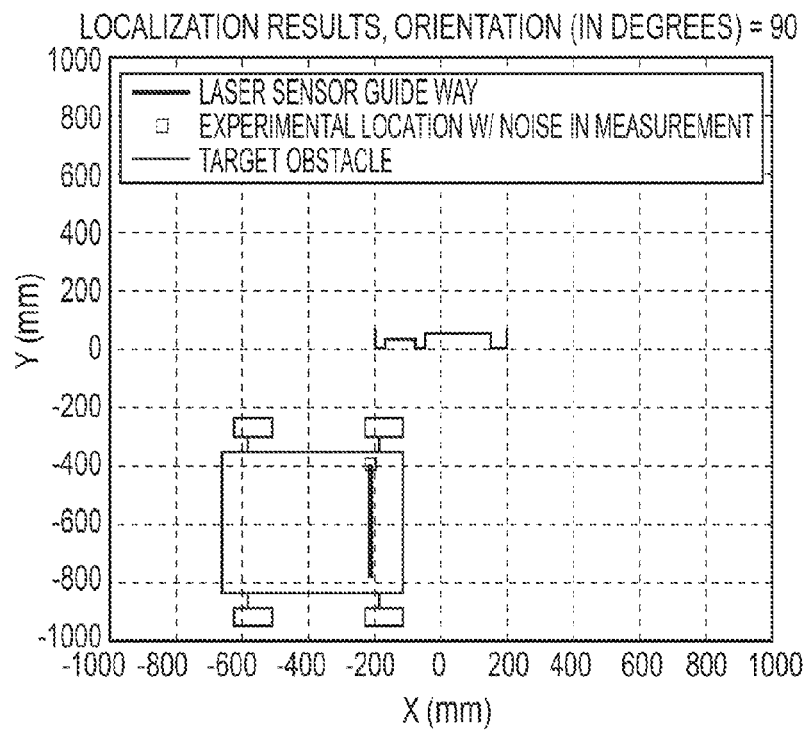
FIG. 32 graphically depicts localization results (orientation of IWMR=90 degrees).
Figure 33:
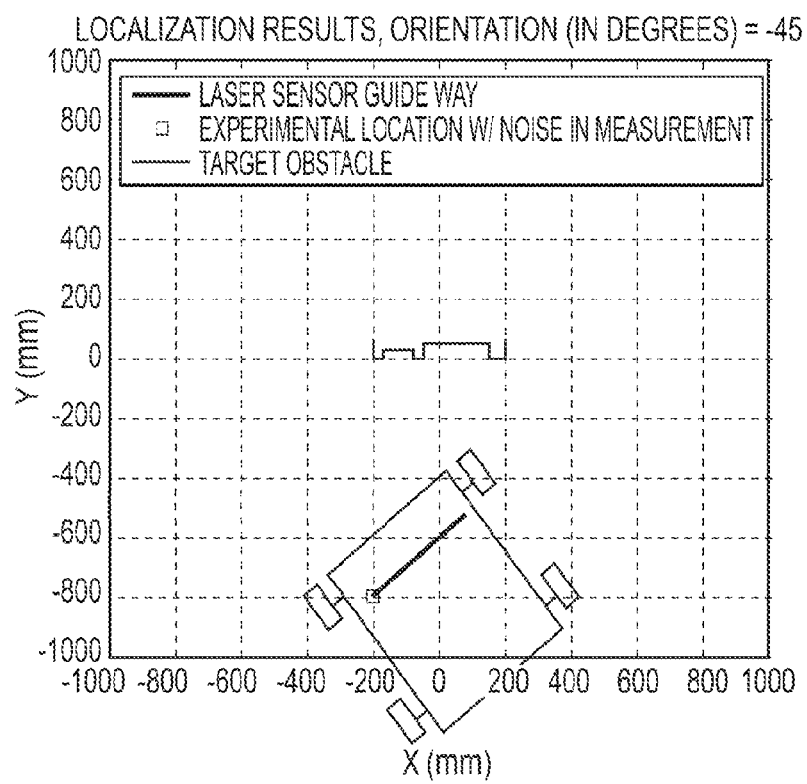
FIG. 33 graphically depicts localization results (orientation of IWMR=45 degrees).

The experimental location and the localization results for the experiments carried out in FIG. 30-FIG. 33 is tabulated in Table 5 above. FIG. 32 and FIG. 33 show the accuracy of the localization with experimental results when IWMR orientation is other than 0 degrees.

From these experimental results, it will be appreciated by those skilled in the art that the analytical determination for location and orientation works well, even with noise filled laser sensor measurements.

Analysis of Design Parameters

Next, optimizing design parameters, e.g., a) length of the target and b) length of the laser sensor guide way, will be described according to one embodiment. Eq. (10) shows that noise in the laser distance measurements $m_{1L}$ and $m_{2R}$ are related to the design parameters. Though there will be noise in measurements $m_{1R}$ and $m_{2L}$, their influence on the localization results generally cannot be minimized by optimizing the design parameters. Hence, efforts are taken to reduce the influence of noise in measurement $m_{1L}$ on the orientation results ($\delta\phi'$).

Since the location results can depend directly on the orientation results, design optimization of the target is done for the orientation results only. It can be presumed that the preferred orientation results are—localization error has a magnitude equal to or less than that of noise in measurements. The orientation formula in Eq. (10) can be re-written as follows:

$$\sin(\theta_{2R} - \phi) = \left[ \frac{1/2\sqrt{4m_{1R}^2 m_{2L}^2 - (m_{1L}^2 + m_{2R}^2 - l^2 - L^2)^2} - Lm_{1L}\sin\theta_{1L}}{lm_{2R}} \right] \quad (14)$$

$$\sin(\theta_{2R} - (\phi + \delta\phi')) = \left[ \frac{1/2\sqrt{4m_{1R}^2 m_{2L}^2 - ((m_{1L} + \delta m)^2 + m_{2R}^2 - l^2 - L^2)^2} - L(m_{1L} + \delta m)\sin\theta_{1L}}{lm_{2R}} \right] \quad (15)$$

Subtracting Eq. (15) form Eq. (14)
Left hand side:

$$\Rightarrow \sin(\theta_{2R} - \phi) - \sin(\theta_{2R} - (\phi + \delta\phi')) \quad (16)$$
$$= \sin(\theta_{2R} - \phi) - \sin(\theta_{2R} - \phi - \delta\phi')$$
$$= \sin(\theta_{2R} - \phi) - \sin(\theta_{2R} - \phi)\cos\delta\phi' + \cos(\theta_{2R} - \phi)\sin\delta\phi'$$
$$= \sin(\theta_{2R} - \phi)(1 - \cos\delta\phi') + \cos(\theta_{2R} - \phi)\sin\delta\phi'$$

If we can assume $\delta\phi'$ to be small, then under small angle approximation RHS of Eq. (16) can be rewritten as $$= \cos(\theta_{2R} - \phi)\delta\phi' \quad (17)$$

Subtracting Eq. (15) from Eq. (14)
Right hand side:

$$\left[ \frac{1/2\sqrt{4m_{1R}^2 m_{2L}^2 - (m_{1L}^2 + m_{2R}^2 - l^2 - L^2)^2} - Lm_{1L}\sin\theta_{1L}}{lm_{2R}} \right] - \quad (18)$$

$$\left[ \frac{1/2\sqrt{4m_{1R}^2 m_{2L}^2 - ((m_{1L} + \delta m)^2 + m_{2R}^2 - l^2 - L^2)^2} - L(m_{1L} + \delta m)\sin\theta_{1L}}{lm_{2R}} \right]$$

$$= \left[ \frac{1/2\sqrt{4m_{1R}^2 m_{2L}^2 - (m_{1L}^2 + m_{2R}^2 - l^2 - L^2)^2} - Lm_{1L}\sin\theta_{1L}}{lm_{2R}} \right] - \quad (19)$$

$$\left[ \frac{1/2\sqrt{4m_{1R}^2 m_{2L}^2 - (m_{2R}^2 - l^2 - L^2)^2 \left(1 + \frac{(m_{1L} + \delta m)^2}{(m_{2R}^2 - l^2 - L^2)}\right)^2} - L(m_{1L} + \delta m)\sin\theta_{1L}}{lm_{2R}} \right]$$

-continued $$= \left[\frac{1/2\sqrt{4m_{1R}^2 m_{2L}^2 - (m_{1L}^2 + m_{2R}^2 - l^2 - L^2)^2} - Lm_{1L}\sin\theta_{1L}}{lm_{2R}}\right] - \left[\frac{1/2\sqrt{4m_{1R}^2 m_{2L}^2 - (m_{2R}^2 - l^2 - L^2)^2\left(1 + \frac{(m_{1L}^2 + 2\delta mm_{1L} + \delta m^2)}{(m_{2R}^2 - l^2 - L^2)^2}\right)}}{(lm_{2R})} - \frac{L(m_{1L} + \delta m)\sin\theta_{1L}}{(lm_{2R})}\right] \quad (20)$$

In Eq. (20) we can see that the term $$\frac{2\delta mm_{1L} + \delta m^2}{(m_{2R}^2 - l^2 - L^2)^2}$$

is going to go to zero, because we are dividing a small value δm by a denominator which is the fourth power of measurements. When we equate this term to zero, the terms inside the square root are exactly same and get cancelled. Thus the RHS becomes $$\cong \left[\frac{L(m_{1L} + \delta m)\sin\theta_{1L} - Lm_{1L}\sin\theta_{1L}}{lm_{2R}}\right] \quad (21)$$

$$\cong \left[\frac{L\delta m\sin\theta_{1L}}{lm_{2R}}\right] \quad (22)$$

Equating Eq. (17) and Eq. (22) we get $$\cos(\theta_{2R} - \phi)\delta\phi' = \left[\frac{L\delta m\sin\theta_{1L}}{lm_{2R}}\right] \Rightarrow \frac{\delta\phi'}{\delta m} = \left[\frac{L\sin\theta_{1L}}{lm_{2R}\cos(\theta_{2R} - \phi)}\right] \quad (23)$$

In Eq. (23), left hand side is equal to or less than one if we want the error in orientation results to be less in order than that of noise in measurement. This gives a limit on the design parameters which is given in Eq. (24).

$$\frac{L}{l} \leq \left[\frac{m_{2R}\cos(\theta_{2R} - \phi)}{\sin\theta_{1L}}\right] \quad (24)$$

The right hand side of the above expression can vary between [0, $m_{2Rmax}$]. Here, $m_{2Rmax}$ is the maximum value of $m_{2R}$. Though mathematically, Eq. (24) has a lower bound of 0, realistically we can say that $$\frac{L}{l} \leq m_{2Rmax} \quad (25)$$

The reasoning behind that is—If we have L=0, then the technique might lose its robustness. When the laser sensor is made to stand at a single point there is a chance that the target might not be detected. Hence Eq. (25) is the choice for an upper bound. Continuing, there is also a lower limit on the design parameters. In one embodiment, the design parameters have to be greater than twice the value of noise in the laser sensor distance measurements. This gives a lower bound on the design parameters given in Eq. (26). In Eq. (26) $l_{max}$ denotes the maximum length of the target.

$$\frac{L}{l} \leq \frac{2\delta m}{l_{max}} \quad (26)$$

Simulation Results—Localization

Figure 34:
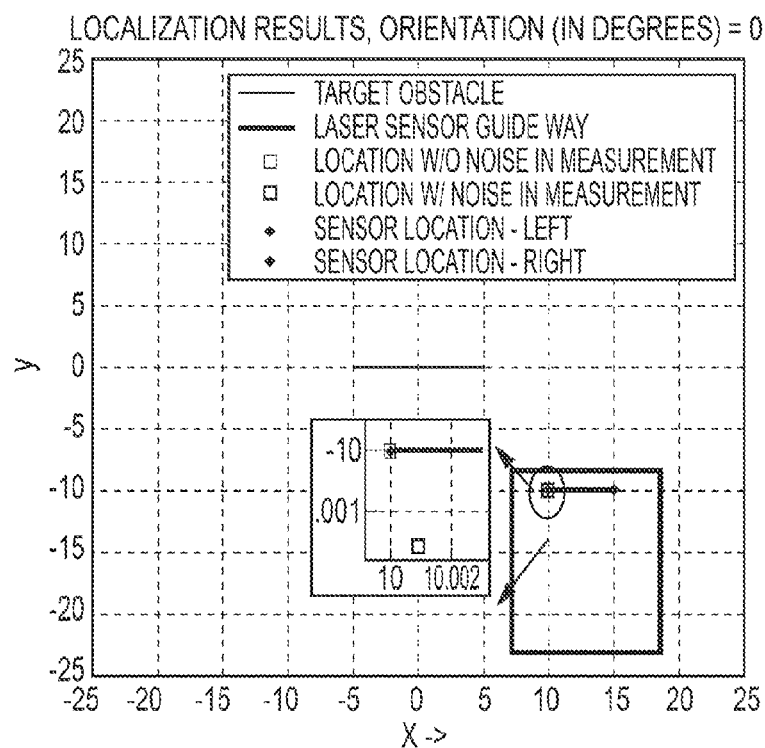
FIG. 34 graphically depicts localization results (IWMR in quadrant IV).
Figure 35:
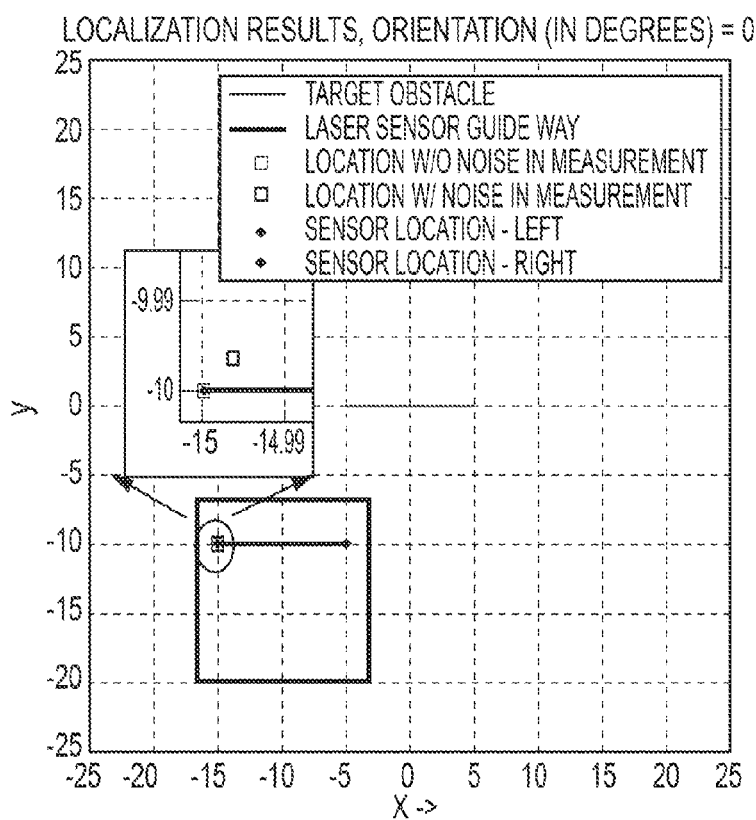
FIG. 35 graphically depicts localization results (IWMR in quadrant III).

In this section the simulations that were carried on according to one embodiment to evaluate the vehicle orientation and localization formulae are shown. In particular, a MATLAB based code was developed for the same and the results are shown below. In this simulation, the noise of measurements is approximated by a white Gaussian noise. FIG. 34 and FIG. 35 show the accuracy of the kinematic based localization results when the vehicle is located in fourth and third quadrants respectively. To facilitate understanding by those skilled in the art, a black rectangle is drawn around the laser sensor guide way which shows the IWMR itself.

In FIG. 34, the left end of the laser sensor guide way is zoomed in to show that the sensor location—left and the localization without noise in measurement matches perfectly. The localization with noise in measurement has small error, but it is of the order of 0.001 in both 'x' and 'y' directions.

Figure 36:
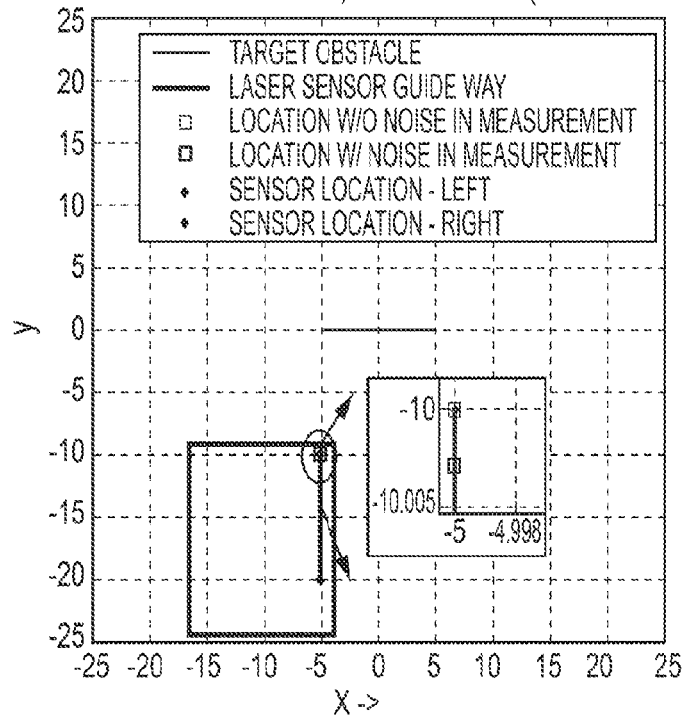
FIG. 36 graphically depicts localization results (orientation of IWMR=90 degrees).
Figure 37:
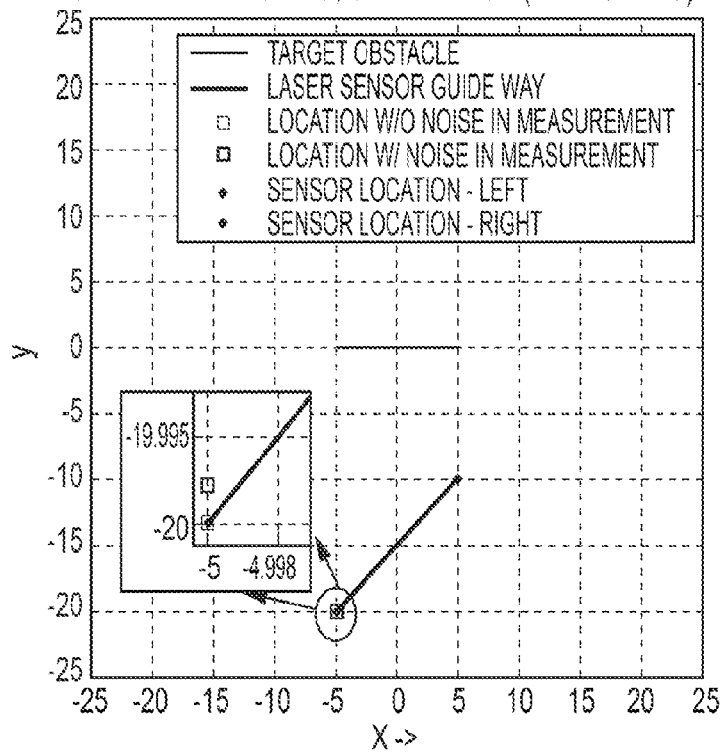
FIG. 37 graphically depicts localization results (orientation of IWMR=45 degrees).

FIG. 36 and FIG. 37 show the accuracy of the localization algorithm when the orientation is different from 0 degrees.

Figure 38:
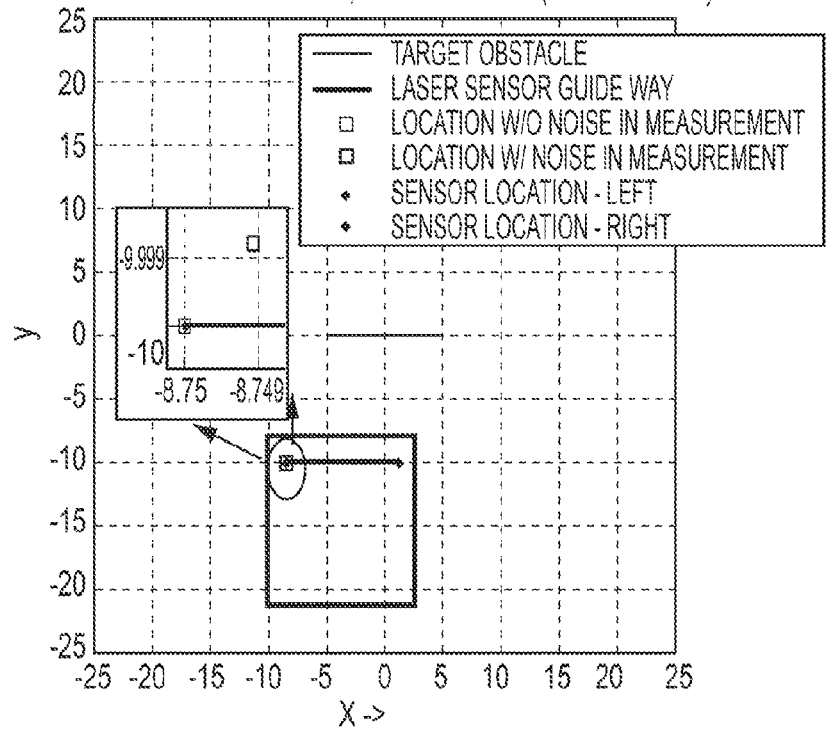
FIG. 38 graphically depicts localization results (error in orientation).

In one example, sensor noise was considered to be 2% with $m_{2Rmax}$=2. For such a sensor, the optimal design parameters will be L=2*l. FIG. 38 shows that, when L=4*l, the error in orientation result is 1 degrees.

Figure 39:
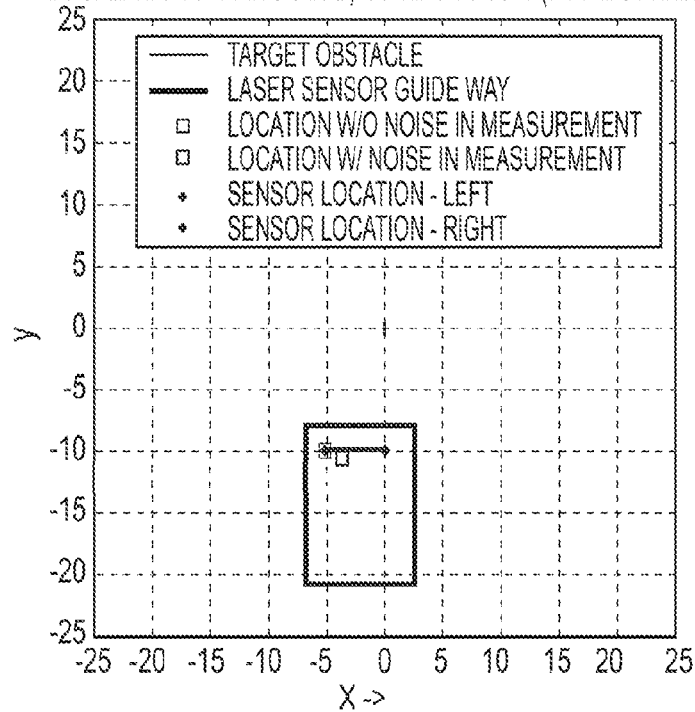
FIG. 39 graphically depicts localization results (error in orientation, when length of target <2*noise).

FIG. 39 shows the error in results when the length of the target is 0.01 units which is lesser than 2δm (0.04).

Simulation Results—Influence of Design Parameters

Figure 40:
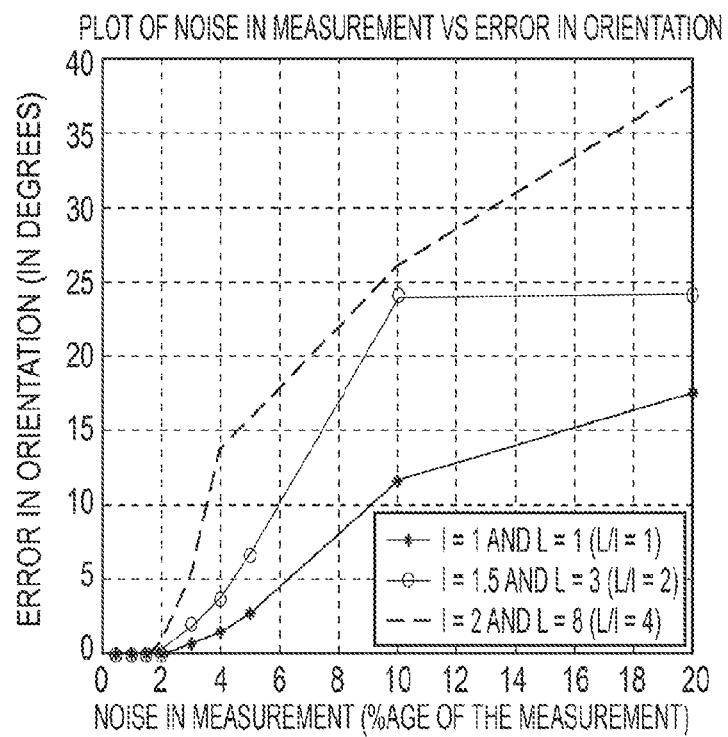
FIG. 40 graphically depicts error in orientation vs. noise in measurement.

In this section the simulations that were carried on to evaluate the design parameter analysis are shown. FIG. 40 shows the error in orientation results vs. noise in measurements as a function of L/l. At first sight it may seem like having a large target alone can reduce the influence of noise in measurement on the localization results. But the entire analysis in the preceding section showed that the ratio between the design parameters is more important.

In this plot the target length 'l' is increased along with an increase in the laser sensor guide way length 'L' such that increase in L is greater. Intuitively one might suggest that increase in target length has to give better localization results. But FIG. 40 shows that the localization results get worse with an increase in the target length 'l' but a proportionally higher increase in laser sensor guide way length 'L'. Moreover, the simulation results show that the localization accuracy becomes worse with increasing L/l ratio, which is consistent with the analysis presented in the preceding section.

Figure 41:
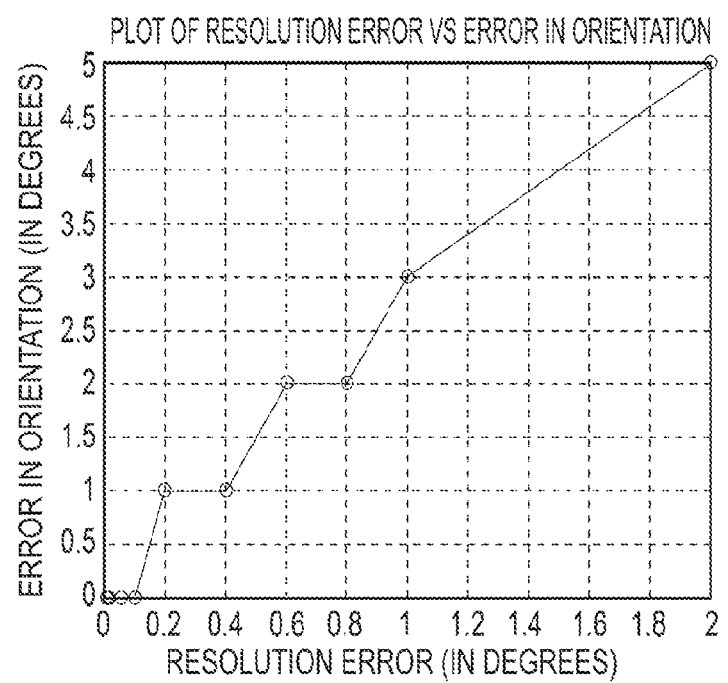
FIG. 41 graphically depicts error in orientation vs. resolution error.

The assumption thus far in the entire work is that $\theta_{1L}$, $\theta_{1R}$, $\theta_{2L}$, $\theta_{2R}$ are known accurately. But the assumption cannot be always true due to limitations on the finite resolutions of angular measurements. The angular measurements have their own accuracy which will influence the orientation results as seen from the equations above. In order to have a rough estimate on how the results are going to be affected by the angular measurement resolution error, the plot shown in FIG. 41 is generated by simulations. This can be helpful in choosing angular measurement devices depending upon the level of accuracy desired.

This disclosure presents an IWMR global localization technique using only an onboard laser sensor. Laser sensor is used to recognize the pattern of a unique target, which in turn is used as the reference to localize globally. A kinematic model for the global localization of IWMR using laser sensor alone was developed and presented. Also, the target design and the target recognition technique are presented. Hausdorff distance based template comparison technique was used as the target recognition approach.

The experimental results show clearly that this technique can be implemented merely placing the designed target in a known global location in an unknown environment. The experimental results show that error in localization results is lesser than the error in laser sensor measurements which shows that this technique is robust to noise.

It will further be appreciated that several of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the present disclosure and/or the following claims.

Nomenclature l Length of the target
$d_i$ Depth of edge i in the target
$w_i$ Width of depth i in the target
L Length of the laser sensor guide way
$\theta_{1L}$ Angle made by the laser sensor from the left end on the guide way to the left end of the target with positive x axis.
$\theta_{1R}$ Angle made by the laser sensor from the left end on the guide way to the right end of the target with positive x axis.
$\theta_{2L}$ Angle made by the laser sensor from the right end on the guide way to the left end of the target with positive x axis.
$\theta_{2R}$ Angle made by the laser sensor from the right end on the guide way to the right end of the target with positive x axis.
$\Phi$ IWMR orientation with respect to the positive Xv axis used for target recognition alone.
$m_{1L}$ Measurements denoted using the same convention as the angles above.
$u_s$ Unit step function
$X_v, Y_v$ IWMR body-fixed co-ordinates.
$\phi$ IWMR orientation by localization.
$x_v, y_v$ IWMR location in the body-fixed coordinates.
x,y IWMR location in global co-ordinates.
$\delta m$ Noise in measurement of $m_{1n}$.
$\delta \phi$ Error in orientation results due to noise in measurements.
$\delta \phi'$ Error in orientation results due to $\delta m$ alone.
$l_{max}$ Maximum length of the target.

The invention claimed is:

1. A computer implemented method for localizing a wheeled robot/vehicle using a laser sensor, comprising:
    scanning an angular section of a surrounding environment of the wheeled robot/vehicle by the laser sensor, wherein the laser sensor is mounted on a rotary actuator of the wheeled robot/vehicle;
    identifying a target, wherein identifying the target includes detecting edges on the target and recognizing a pattern of the target based on the scanning by the laser sensor, wherein detecting the edges on the target is based on laser sensor measurements and rotary actuator angular positions of the rotary actuator, and wherein detecting the edges on the target includes identifying two edges that have a minimum length equal to a minimum depth of the target;
    transforming the laser sensor measurements and the rotary actuator angular positions into vehicular coordinates, wherein the vehicular coordinates are associated to the target as identified from the laser sensor and derived from time instant points corresponding to the two edges, wherein the time instant points are joined in a straight line;
    determining global coordinates for the vehicular coordinates based on a slope of the straight line; and
    controlling the wheeled robot/vehicle to travel autonomously based on the global coordinates.

2. The computer implemented method of claim 1 wherein the determined global coordinates are compared with templates of the target to confirm that the target has been recognized.

3. The computer implemented method of claim 2 wherein comparing determined global coordinates with templates includes translating the templates that are defined in global coordinates into laser coordinates and minimizing Hausdorff distances between the determined global coordinates and the templates.

4. The computer implemented method of claim 1 further including:
    generating templates for the target, wherein templates for the target include three different templates that are each utilized based on the location of the wheeled robot/vehicle.

5. The computer implemented method of claim 1 wherein controlling the wheeled robot/vehicle includes:
    determining an orientation and location of the wheeled robot/vehicle based on the global coordinates.

6. The computer implemented method of claim 4 wherein each different template of the three different templates represent three different zones in front of the target, wherein the wheeled robot/vehicle is located within one of the three different zones.

7. The computer implemented method of claim 1 further including reducing the influence of noise in the laser sensor measurements on the determined global coordinates.

8. The computer implemented method of claim 7 further including approximating the noise of the laser sensor measurements by a white Gaussian noise.

9. The computer implemented method of claim 1 wherein the laser sensor has rotary and linear motion capabilities.

* * * * *